United States Patent [19]

Sakaguchi et al.

[11] Patent Number: 5,371,635
[45] Date of Patent: Dec. 6, 1994

[54] ELECTRONIC INDEX PULSE GENERATING SYSTEM FOR SPEED CONTROL IN ROTATING DISK DATA

[75] Inventors: Takahiro Sakaguchi, Kodaira; Daihachiro Takasu, Niiza, both of Japan

[73] Assignee: Teac Corporation, Tokyo, Japan

[21] Appl. No.: 894,512

[22] Filed: Jun. 4, 1992

[30] Foreign Application Priority Data

Jun. 7, 1991 [JP] Japan .................. 3-163639

[51] Int. Cl.⁵ .......................................... G11B 19/24
[52] U.S. Cl. ..................... 360/73.03; 360/73.01; 360/99.08; 360/99.04; 318/254
[58] Field of Search ........... 360/73.03, 99.08, 73.01, 360/99.04; 318/254

[56] References Cited

U.S. PATENT DOCUMENTS

| | | | |
|---|---|---|---|
| 4,445,157 | 4/1984 | Takahashi | 360/133 |
| 4,746,862 | 5/1988 | Ueki | 360/73.03 |
| 4,758,915 | 7/1988 | Sakaguchi | 360/97 |
| 5,036,264 | 7/1991 | Ueki | 318/254 |
| 5,038,240 | 8/1991 | Isomura | 360/99.08 |
| 5,041,769 | 8/1991 | Iwai | 318/254 |

Primary Examiner—Aristotelis Psitos
Assistant Examiner—James L. Habermehl
Attorney, Agent, or Firm—Woodcock Washburn Kurtz Mackiewicz & Norris

[57] ABSTRACT

An index pulse generating system utilizes two periodic motor speed signals, one generated by a speed sensor coil actuated upon by a permanent magnet rotor mounted to a turntable, and the other generated by one of magnetoelectric converters acted upon by another permanent magnet rotor mounted to the turntable as a part of a disk drive motor. The two motor speed signals are translated respectively into two series of discrete motor speed pulses. One of the two series of motor speed pulses are produced at rates of two different predetermined numbers per complete revolution of the turntable. The two predetermined numbers have no common measure so that an AND gate or the like inputting the two series of motor speed pulses puts out at least one pulse during each turntable revolution, with the output pulse being representative of a specific angular position of the turntable.

9 Claims, 22 Drawing Sheets

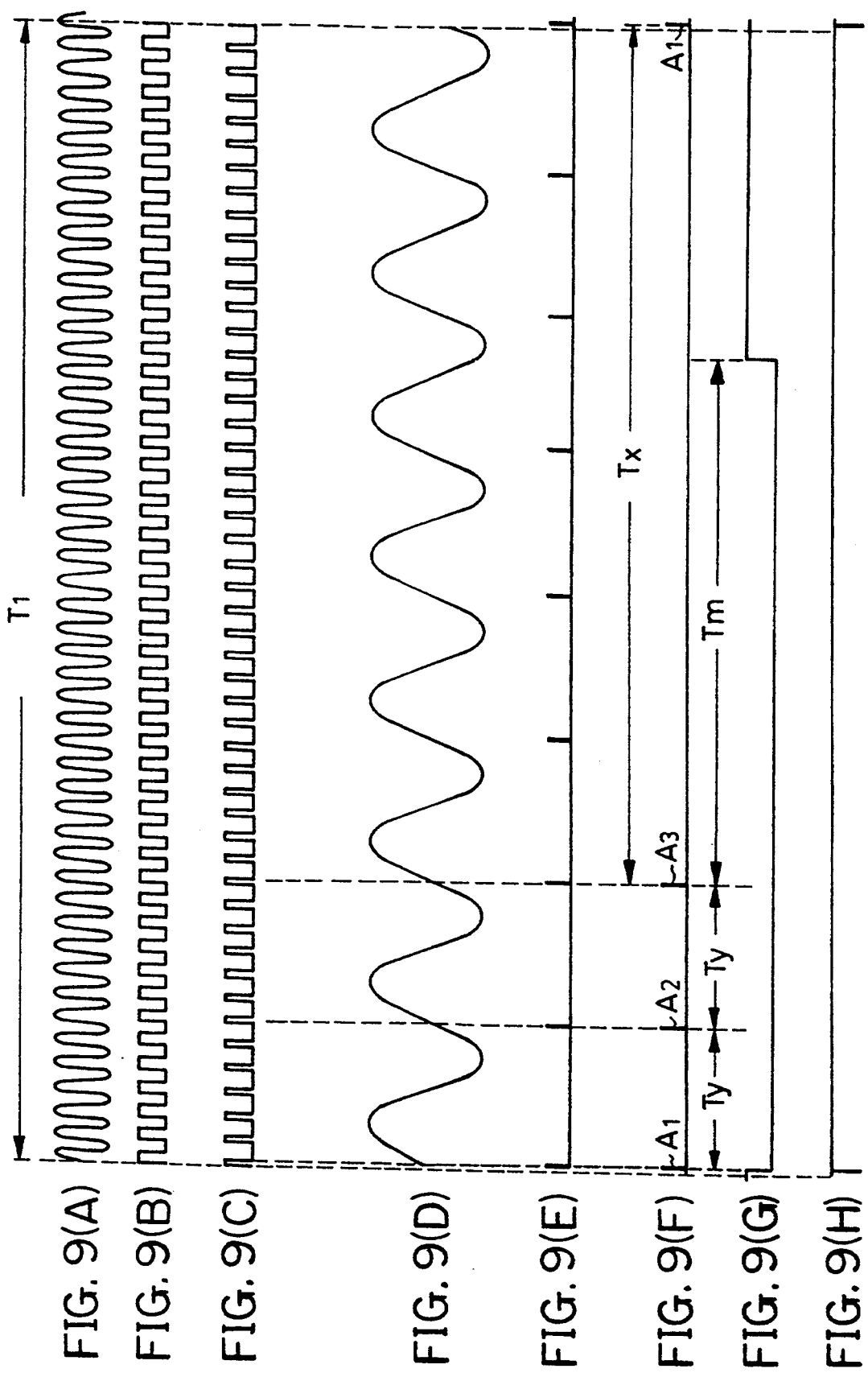

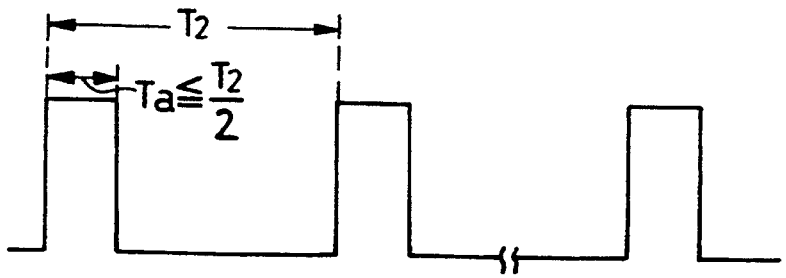
FIG. 10(A) MMV 118
FIG. 10(B) MMV 122
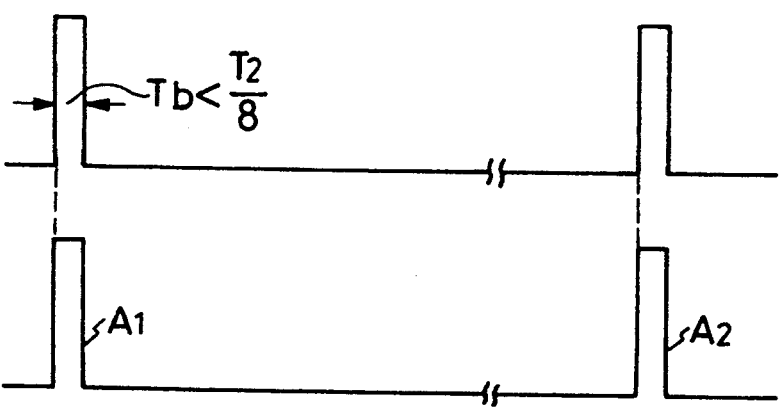
FIG. 10(C) AND 110
FIG. 10(D) MMV 124
FIG. 10(E) MMV 128
FIG. 10(F) MMV 130

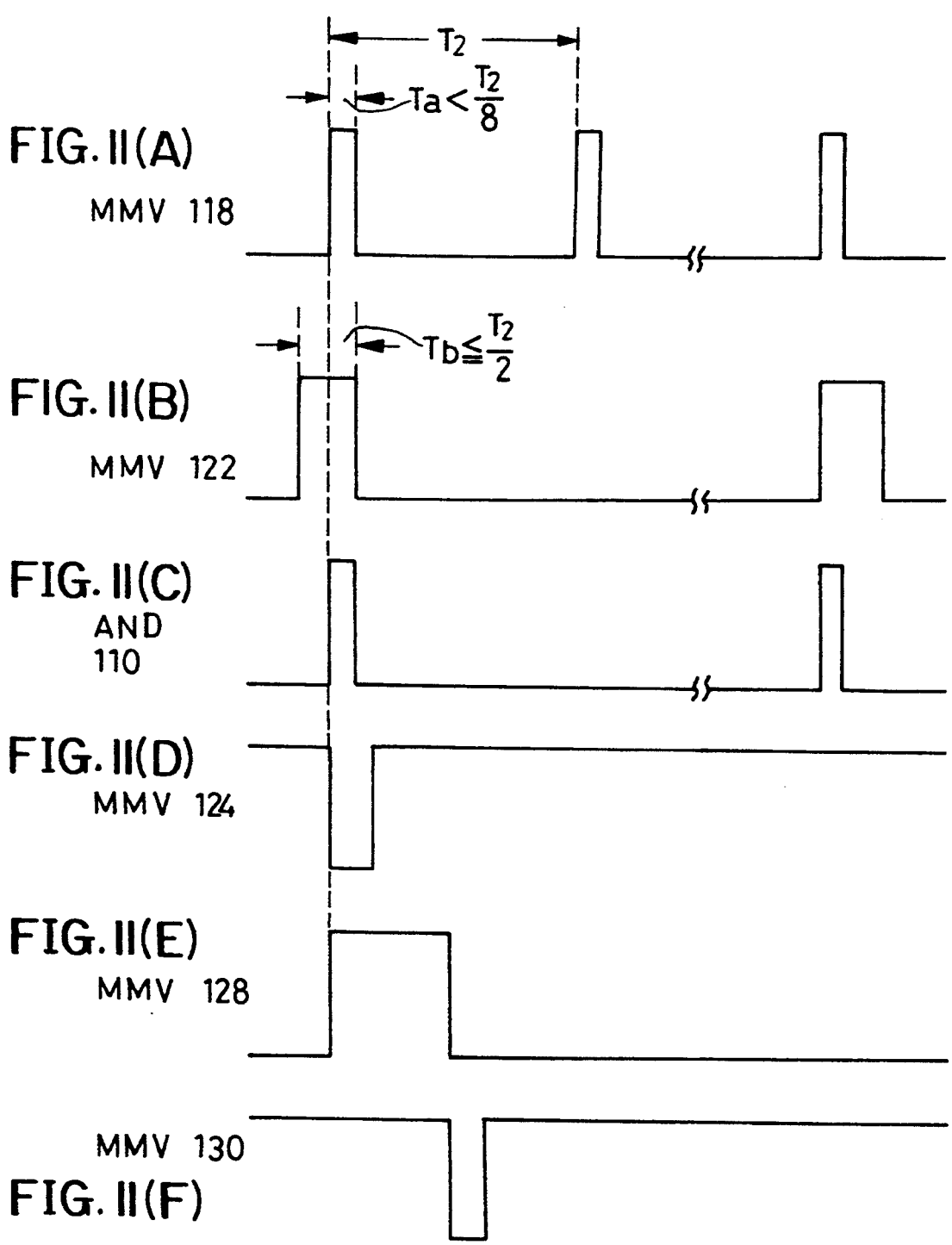

MMV 118

MMV 122

AND 110

MMV 128

MMV 130

MMV 118

MMV 122

AND 110

MMV 128

MMV 130

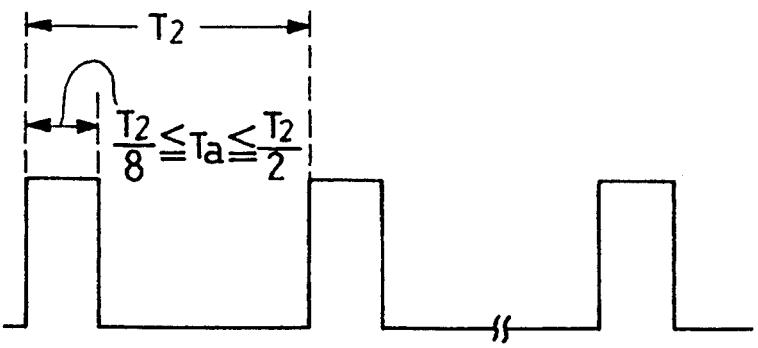
FIG.18(A) MMV 118
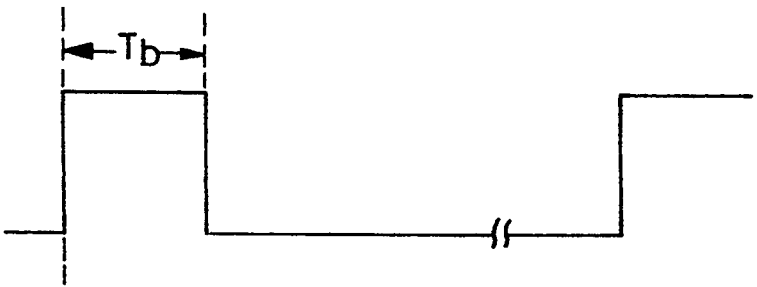
FIG.18(B) MMV 122
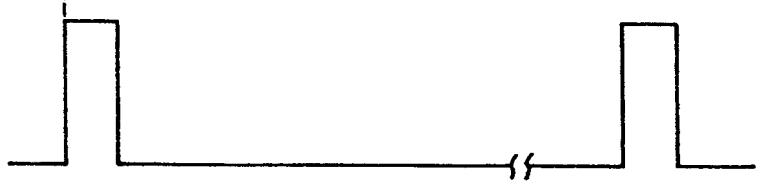
FIG.18(C) MMV 140
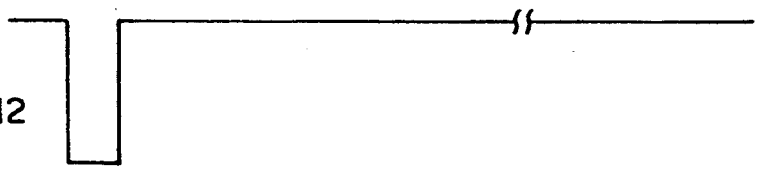
PULSE SELECT CIRCUIT 112
FIG.18(D)
MMV 128
FIG.18(E)
MMV 130
FIG.18(F)

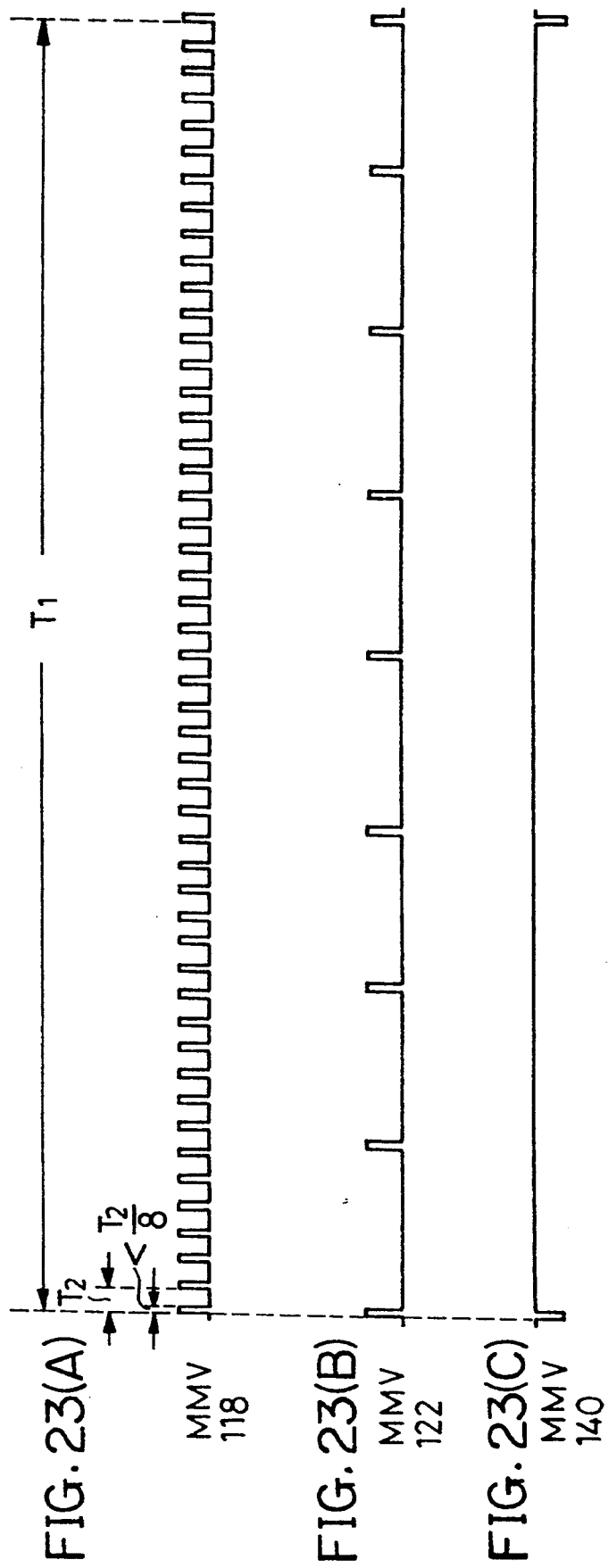

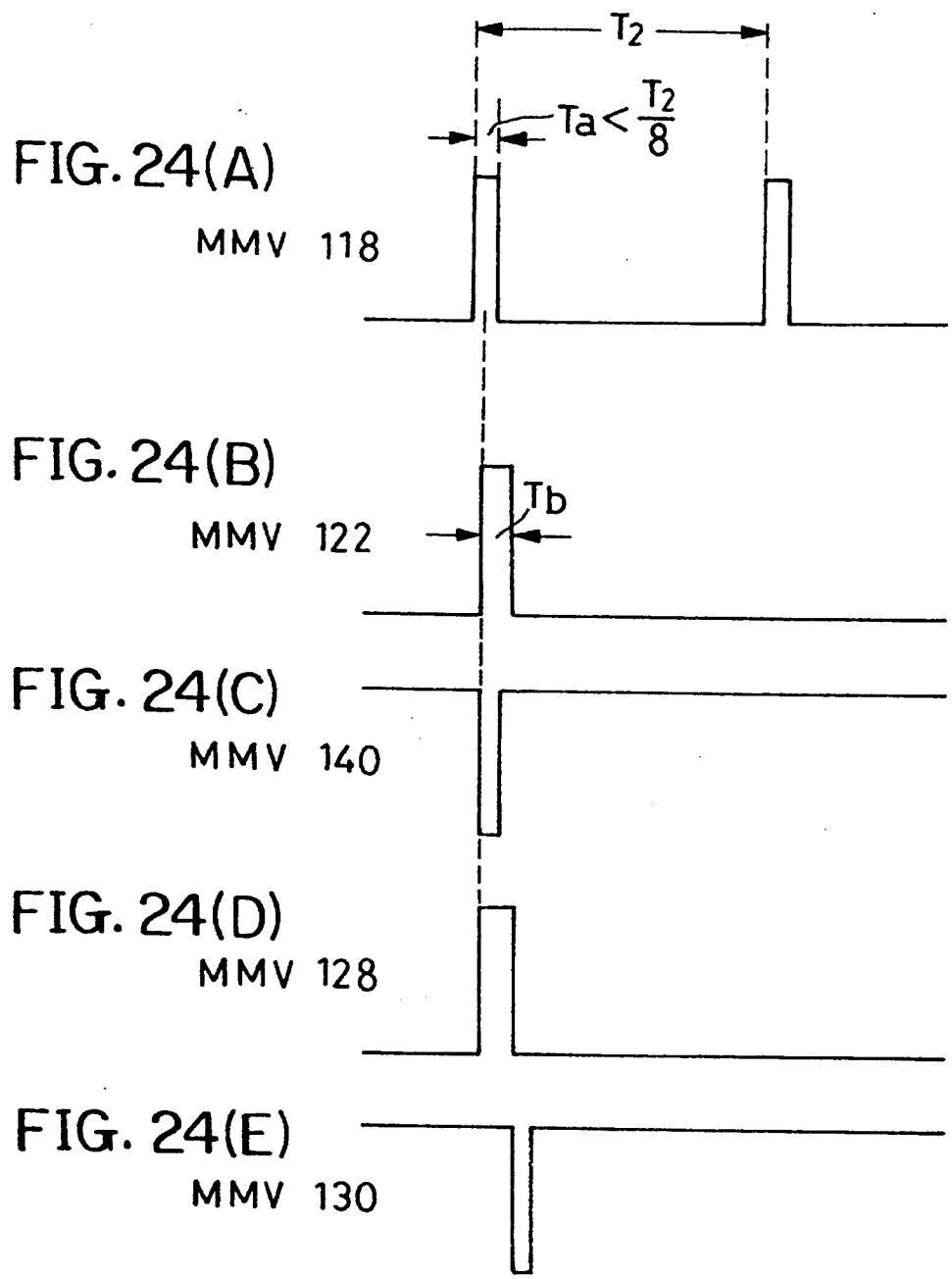

ELECTRONIC INDEX PULSE GENERATING SYSTEM FOR SPEED CONTROL IN ROTATING DISK DATA

BACKGROUND OF THE INVENTION

This invention relates generally to apparatus for data transfer with a rotating data storage disk such as, typically, a flexible magnetic disk of three and a half inch diameter packaged in cassette form. More specifically, the invention pertains, in such rotating disk data storage apparatus, to a novel system for generating index pulses indicative of the angular position and rotational speed of the disk.

The three and a half inch flexible magnetic disk and a disk drive for use therewith are both described and claimed in U.S. Pat. No. 4,445,157 to Takahashi. The magnetic disk is rotatably housed in a generally flat, boxlike envelope of relatively rigid plastic material, complete with a metal made sliding shutter, to make up a disk cassette. The envelope has a pair of apertures of rectangular shape to expose radial portions of the opposite sides of the magnetic disk. The sliding shutter also has a pair of apertures of approximately the same shape and size as the envelope apertures, which shutter apertures come into and out of register with the envelope apertures. The magnetic disk has a rigid hub of magnetic sheet metal attached centrally thereto. The hub has defined therein a central opening of square shape and an eccentric opening of rectangular shape.

When positioned in the associated disk drive, the magnetic disk has its central hub placed on a turntable which is much less in diameter than the disk. The turntable has a permanent magnet mounted thereon for attracting the disk hub. Disposed centrally on the turntable, a spindle engages in the central opening in the disk hub for centering the magnetic disk on the turntable. A drive pin is disposed eccentrically on the turntable for driving engagement in the eccentric opening or slot in the disk hub, imparting the rotation of the turntable to the magnetic disk.

The eccentric slot in the disk hub has a predetermined positional relationship to a reference position (e.g. starting position of the first sector) on the disk. Unlike the standard five and a quarter inch magnetic disk, however, the three and a half inch disk has no index hole formed therein. Means other than the familiar index hole sensor are therefore required for generating index pulses.

U.S. Pat. No. 4,758,915 to Sakaguchi discloses a conventional approach to the problem of how to generate index pulses in data storage apparatus for use with the three and a half inch magnetic disk. It teaches to attach an index mark, such as a permanent magnet or optical reflector, to the rotor of a disk drive motor of the known rotor outside stator construction. An index sensor is immovably disposed opposite the orbit of the index mark, producing a pulse each time the index mark travels past the sensor. The output pulses of the index sensor serve as index pulses because the index mark on the motor rotor has a predetermined positional relationship to the eccentric drive pin on the turntable, to which the disk drive motor is coupled directly, and thence to the reference position on the disk.

An objection to this conventional approach is that the index sensor, which typically takes the form of a magnetoelectric or photoelectric converter, is not as inexpensive as can be desired. Its mounting in position adjacent the disk drive motor has also been troublesome and time consuming. Moreover, as disk drives has grown less and less in size in recent years to meet the needs and demands of users, the index sensor has come to represent a serious impediment to further reduction in the size of the disk drive.

SUMMARY OF THE INVENTION

The present invention seeks to provide, in rotating disk data storage apparatus of the type defined, a novel index pulse generating system that dispenses with the conventional index mark and index sensor and which makes only a minimum of space requirement as it makes utmost use of electronics together with existing parts of the disk drive.

Stated in brief, the invention concerns a rotating disk data storage apparatus of the type including a turntable on which a data storage disk is to be loaded for data transfer with a transducer or transducers, a disk drive motor having a first permanent magnet rotor mounted to the turntable for joint rotation therewith and a plurality of phases of fixed windings to be selectively energized to cause the first permanent magnet rotor to rotate with the turntable, a speed sensor having a second permanent magnet rotor mounted to the turntable for joint rotation therewith and a fixed speed sensor coil acted upon by the second permanent magnet rotor for generating a first periodic motor speed signal, and a magnetoelectric converter acted upon by the first permanent rotor for generating a second periodic motor speed signal.

More specifically, the invention provides an index pulse generating system in such a rotating disk data storage apparatus, comprising a first pulse forming circuit to be connected to the speed sensor coil for translating the first periodic motor speed signal into a first series of motor speed pulses, a second pulse forming circuit to be connected to the magnetoelectric converter for translating the second periodic motor speed signal into a second series of motor speed pulses, and a coincidence circuit having inputs connected respectively to the first and the second pulse forming circuits for producing pulses when concurrently supplied with the first and the second series of motor speed pulses.

The first motor speed signal has a first predetermined number of cycles per complete revolution of the turntable so that the first series of motor speed pulses are produced at a rate of the first predetermined number per complete revolution of the turntable. The second motor speed signal has a second predetermined number of cycles per complete revolution of the turntable so that the second series of motor speed pulses are produced at a rate of the second predetermined number per complete revolution of the turntable. The first and the second predetermined numbers are different and have no common measure. Accordingly, the coincidence circuit puts out one or more pulses, representative of specific angular position or positions of the turntable, during each complete revolution of the turntable.

Thus the index pulse generating system according to the invention can be constituted of electronic circuitry. The other required parts of the data storage apparatus, the disk drive motor, speed sensor, and magnetoelectric converter, have all been standard parts of the apparatus. The invention has succeeded in generating index pulses by utilizing the two periodic motor speed signals of different frequencies generated by the speed sensor and the magnetoelectric converter and by combining such existing parts of the apparatus with electronic circuitry that makes hardly any space requirement.

In cases where a plurality of pulses are produced by the coincidence circuit during each complete revolution of the turntable, a pulse select circuit may be provided for suppressing all but one of such pulses. Also, regardless of whether one or a plurality of pulses are produced by the coincidence circuit, a timing circuit may be provided for timing each output pulse of the coincidence circuit or of the pulse select circuit in relation to the rotation of the turntable. Such electric adjustment of the time position of index pulses is preferable to the mechanical adjustment of the positional relationship among the parts of the disk drive motor and the speed sensor.

The coincidence circuit may take the form of either a logical sum circuit or a resettable monostable multivibrator. In order to obtain pulses representative of specific angular positions of the turntable with use of a logical sum circuit as the coincidence circuit, the duration of each of the first series of motor speed pulses may be made not more than one eighth of the period of the first series of motor speed pulses, and the duration of each of the second series of motor speed pulses may be made not more than one half of the period of the first series of motor speed pulses. Further the relative time positions of the two series of motor speed pulses may be so determined that the leading edge of one or more of the first series of motor speed pulses may be contained in one or more of the second series of motor speed pulses during each complete revolution of the turntable. Alternatively, the duration of each of the first series of motor speed pulses may be made not more than one half of the period of the first series of motor speed pulses, and the duration of each of the second series of motor speed pulses may be made less than one eighth of the period of the first series of motor speed pulses. Further the relative time positions of the two series of motor speed pulses may be so determined that the leading edge of one or more of the second series of motor speed pulses may be contained in one or more of the first series of motor speed pulses during each complete revolution of the turntable.

It is also possible to cause the coincidence circuit to produce only one pulse during each turntable revolution, with use of a logical sum circuit as the coincidence circuit. To this end the durations of the first and the second series of motor speed pulses may be both made less than one eighth of the period of the first series of motor speed pulses. Further the relative time positions of the two series of motor speed pulses may be so determined that either only one of the first series of motor speed pulses may be contained in one of the second series of motor speed pulses, or only one of the second series of motor speed pulses may be contained in one of the first series of motor speed pulses, during each turntable revolution.

In use of a resettable monostable multivibrator as the coincidence circuit, its trigger input may be connected to the first pulse forming circuit, and its reset input to the second pulse forming circuit, so that the multivibrator may be triggered only when the leading edge of any of the first series of motor speed pulses is contained in any of the second series of motor speed pulses. Further the duration of each of the second series of motor speed pulses may be made from one eighth to one half of the period of the first series of motor speed pulses, and the relative time positions of the two series of motor speed pulses may be so determined that the leading edge of one or more of the first series of motor speed pulses may be contained in one or more of the second series of motor speed pulses during each turntable revolution.

Employed as the coincidence circuit as above, the resettable monostable multivibrator can also be caused to produce only one pulse during each turntable revolution. To this end the duration of each of the second series of motor speed pulses may be made less than one eighth of the period of the first series of motor speed pulses, and the relative time positions of the two series of motor speed pulses may be so determined that the leading edge of only one of the first series of motor speed pulses may be contained in one of the second series of motor speed pulses during each turntable revolution.

Alternately, in use of a resettable monostable multivibrator as the coincidence circuit, its trigger input may be connected to the second pulse forming circuit, and its reset input to the first pulse forming circuit, so that the multivibrator may be triggered only when the leading edge of any of the second series of motor speed pulses is contained in any of the first series of motor speed pulses.

In this case, too, the resettable monostable multivibrator may be caused to produce only one or a plurality of pulses during each turntable revolution. For the production of two or more pulses, the duration each of the first series of motor speed pulses may be made from one eighth to one half of the period of the first series of motor speed pulses, and the relative time positions of the two series of motor speed pulses may be so determined that the leading edges of two or more of the second series of motor speed pulses may be contained in as many of the first series of motor speed pulses during each turntable revolution. For the production of only one pulse, on the other hand, the duration of each of the first series of motor speed pulses may be made less than one eighth of the period of the first series of motor speed pulses, and the relative time positions of the two series of motor speed pulses may be so determined that the leading edge of only one of the second series of motor speed pulses may be contained in one of the first series of motor speed pulses during each turntable revolution.

Embodiments incorporating all such schemes of index pulse production will be disclosed.

The above and other features and advantages of this invention and the manner of realizing them will become more apparent, and the invention itself will best be understood, from a study of the following description and appended claims, with reference had to the attached drawings showing a preferred embodiment of the invention.

BRIEF DESCRIPTION OF THE DRAWINGS

FIG. 9, consisting of (A) through (H), is a diagram of waveforms appearing in various parts of the FIG. 8 index pulse generating circuit;

FIG. 10, consisting of (A) through (F), is a diagram of waveforms useful in explaining one mode of operation of the FIG. 8 index pulse generating system;

FIG. 11, consisting of (A) through (F), is a diagram of waveforms useful in explaining another mode of operation of the FIG. 8 index pulse generating system;

FIG. 18, consisting of (A) through (F), is a diagram of waveforms useful in explaining the operation of the FIG. 17 index pulse generating system;

FIG. 23, consisting of (A) through (C), is a diagram of waveforms appearing in various parts of the FIG. 22 index pulse generating system; and FIG. 24, consisting of (A) through (E), is a diagram of waveforms useful in explaining the operation of the FIG. 22 index pulse generating system.

DESCRIPTION OF THE PREFERRED EMBODIMENTS

Figure 1:
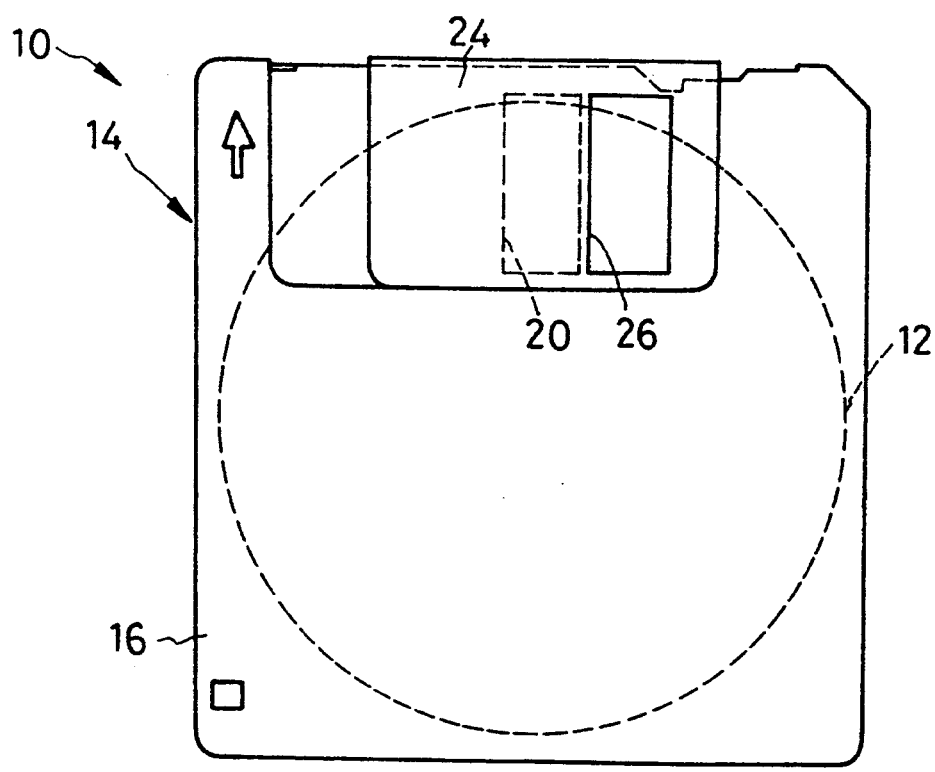
FIG. 1 is a top plan view of the known flexible magnetic disk cassette for use with the apparatus constructed in accordance with the present invention.

The known three and a half inch flexible magnetic disk cassette for use in the practice of this invention will first be described in some more detail, the better to make clear the features and advantages of the invention. Generally designated 10 in FIGS. 1 and 2, the disk cassette has a flexible magnetic disk 12 rotatably housed in a protective envelope 14 of rigid plastic material. The envelope 14 is of square, rather flat boxlike shape, having a front or top side 16 seen in FIG. 1 and a rear or bottom side 18 seen in FIG. 2.

Formed in both top 16 and bottom 18 sides of the envelope 14 and in the vicinity of one edge thereof, are apertures 20 and 22 which are in register with each other. The apertures 20 and 22 expose radial portions of the opposite sides of the magnetic disk 12 for data transfer contact with a pair of data transducers or read/write heads of the associated disk drive to be disclosed subsequently.

Normally, the apertures 20 and 22 in the envelope 14 are both closed by a sliding shutter 24 in the form of a rectangular piece of sheet metal bent into the shape of a U and mounted astride one edge of the envelope. The shutter 24 has itself two apertures 26 and 28 which are out of register with the envelope apertures 20 and 22 when the shutter is in the illustrated right hand position of FIGS. 1 and 2 under the bias of a spring (not shown).

When the disk cassette 10 is loaded in position in the associated disk drive, the shutter 24 will be forced leftwardly of the envelope 14 against the force of the unshown spring. Thereupon the shutter apertures 26 and 28 will come into register with the envelope apertures 20 and 22 thereby exposing the radial portions of the opposite sides of the magnetic disk 12 for data transfer with the data transducers of the disk drive.

Figure 2:
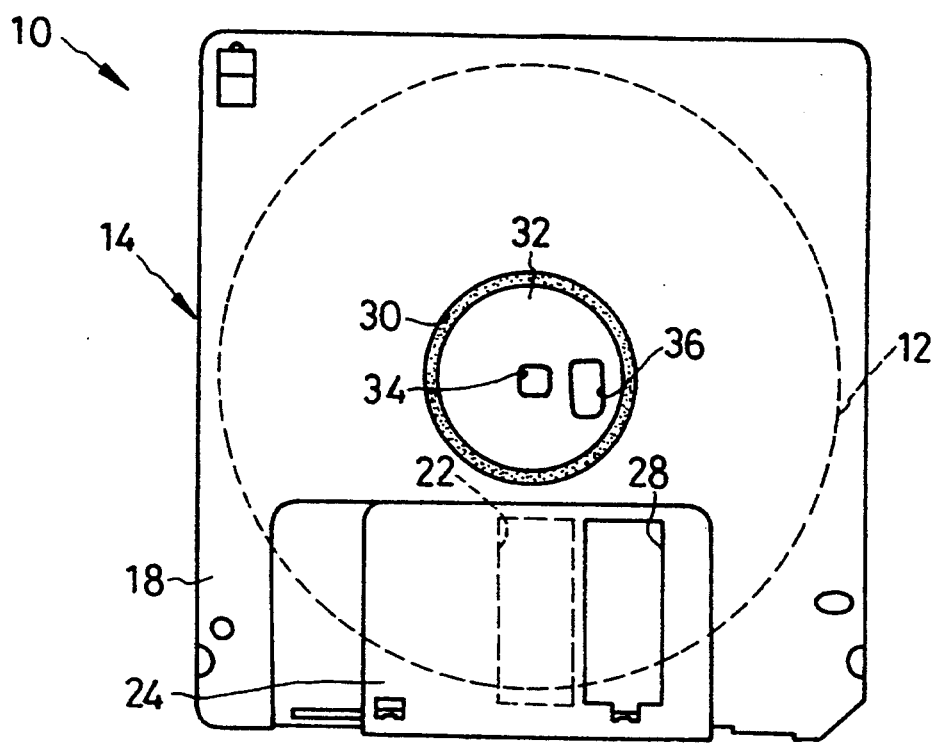
FIG. 2 is a bottom plan view of the magnetic disk cassette of FIG. 1.

The disk cassette 10 is to be placed upon the turntable of the disk drive with the top side 16 of its envelope 14 oriented upwardly. Therefore, as shown in FIG. 2, the bottom side 18 of the envelope 14 has a circular opening 30 formed centrally therein for working engagement of the magnetic disk 12 with the turntable. Exposed through the opening 30 is a hub 32 in the form of a disk of magnetic sheet metal attached centrally to the magnetic disk 12. The hub 32 has defined therein a central opening 34 of square shape and an eccentric opening 36 of rectangular shape.

Figure 3:
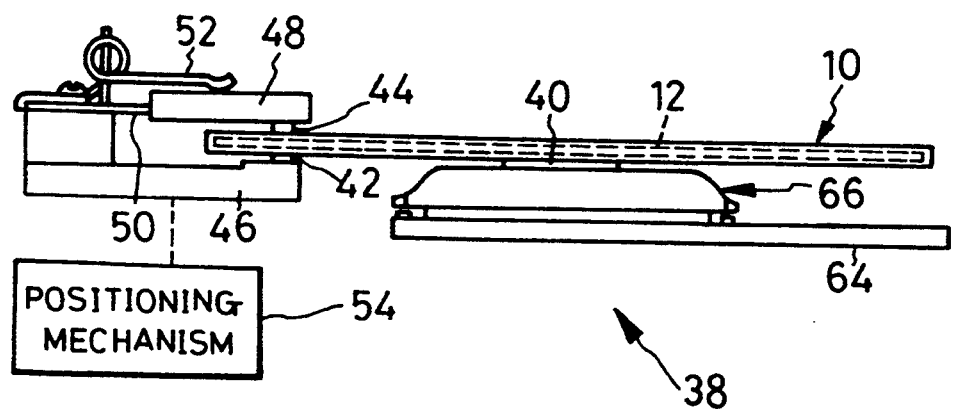
FIG. 3 is a partial side elevation, partly in block form, of the rotating disk data storage apparatus for use with the disk cassette of FIGS. 1 and 2, the apparatus incorporating the index pulse generating system of this invention.

Reference is now directed to FIGS. 3 for a study of a disk drive 38 for data transfer with the flexible magnetic disk cassette 10 of FIGS. 1 and 2. FIG. 3 shows the disk cassette 10 mounted on the turntable 40, so that it is understand that the shutter 24 of the disk cassette is already open. The disk drive 38 has a pair of data transducers 42 and 44 which are now shown to be in data transfer contact with the exposed radial portions of the opposite sides of the disk 12.

The bottom transducer 42, for data transfer with the bottom side of the disk 12, is mounted directly on a carriage 46. The upper transducer 44, on the other hand, is mounted to a load arm 48 which in turn is pivotally mounted to the carriage 46 via a cantilever spring 50. This spring coacts with a torsional load spring 52 to urge the top transducer 44 against the bottom transducer 42 via the disk 12. It is understand that the disk drive 38 is provided with a transducer loading mechanism of any known or suitable construction for moving the top transducer 44 away from the bottom transducer 42 when the disk cassette 10 is being loaded on and unloaded from the turntable 40.

A transducer positioning mechanism is indicated by a block 54 because of its conventional and well known nature. The transducer positioning mechanism 54 is coupled to the carriage 46 for moving the transducers 42 and 44 across the concentric annular data tracks on the opposite major surfaces of the disk 12. Typically, the transducer positioning mechanism may comprise an electric bidirectional stepper motor and a motion translating mechanism such as a lead screw for converting the incremental rotation of the stepper motor into the linear, stepwise travel of the carriage 46.

Figure 4:
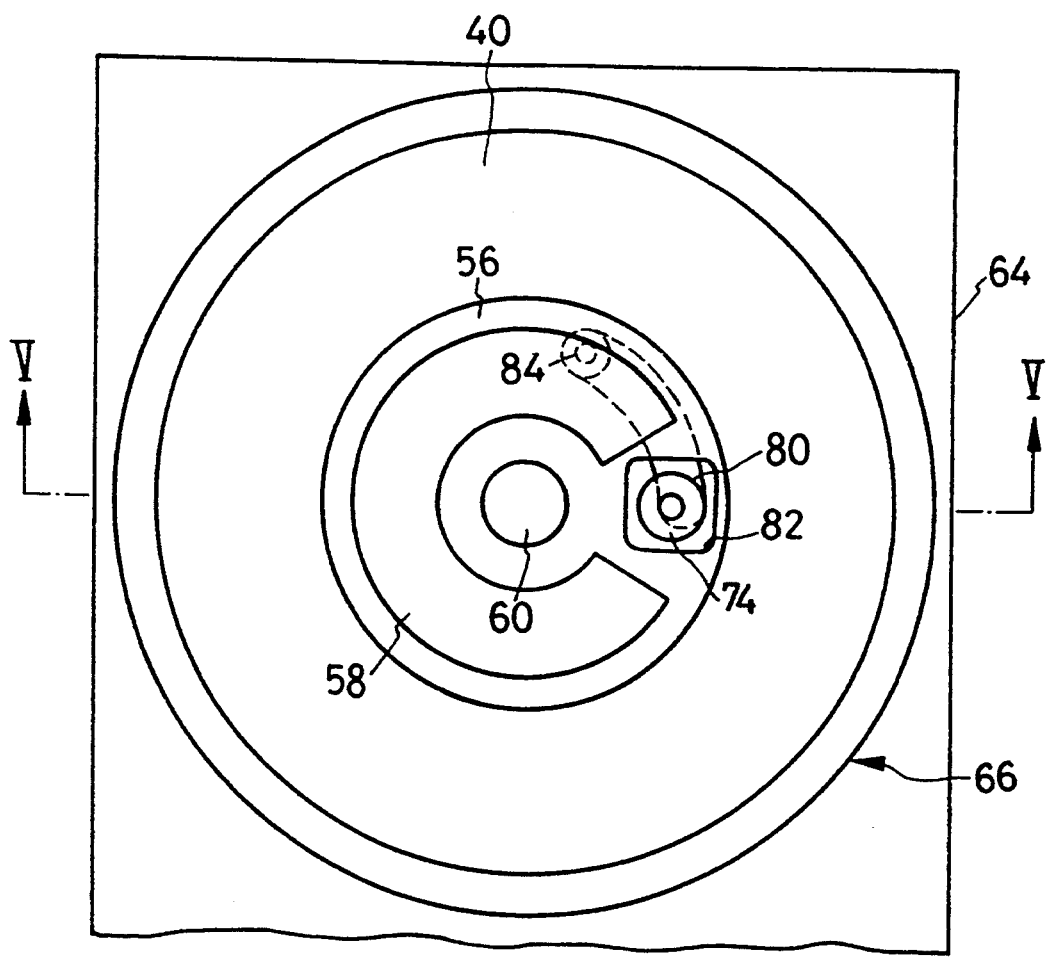
FIG. 4 is an enlarged plan view of the turntable and some associated parts seen in FIG. 3.
Figure 5:
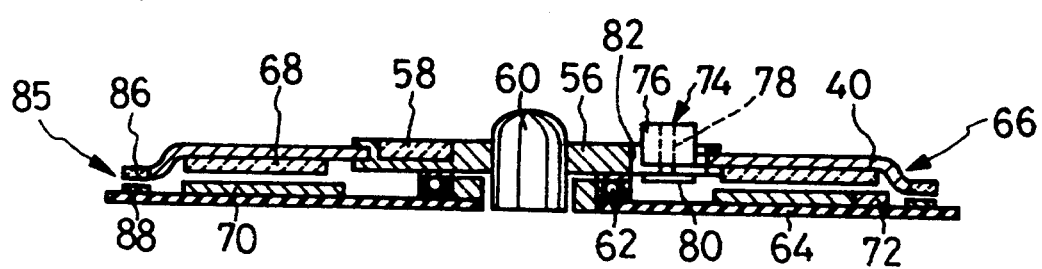
FIG. 5 is a vertical section taken along the line V—V in FIG. 4 and showing in particular the disk drive motor and speed sensor in the FIG. 3 apparatus.

As illustrated in detail in FIGS. 4 and 5, the turntable 40 has a hub 56 with a permanent magnet 58 of horseshoe shape embedded concentrically therein for attracting the sheet metal hub 32, FIG. 2, of the disk 12. Preferably, the magnet 58 may be a molding of a magnetic plastic, that is, a plastic molding containing magnetic particles and permanently magnetized. Annular in shape, the turntable hub 56 is pressfitted over an upstanding spindle 60 which is to be loosely engaged in the central opening 34 in the disk hub 32. The turntable 40 is centrally open and has its inner edge embedded in an annular peripheral groove in the hub 56 for joint rotation therewith. A bearing 62 is provided on a fixed baseplate 64, which may take the form of a printed circuit board in practice, for rotatably supporting the turntable 40 together with the spindle 60.

Figure 6:
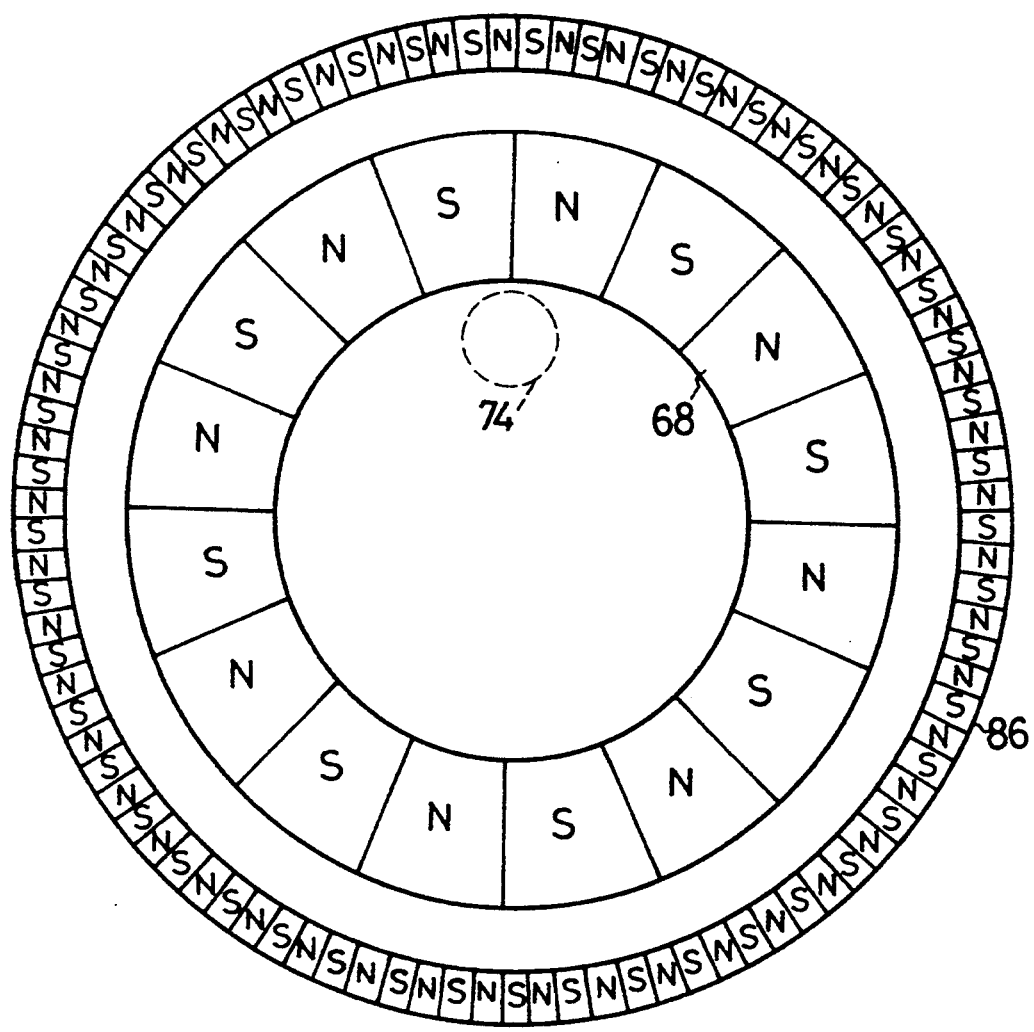
FIG. 6 is an enlarged bottom plan view of the turntable, showing in particular the permanent magnet rotor of the disk drive motor and the permanent magnet of the speed sensor.
Figure 7:
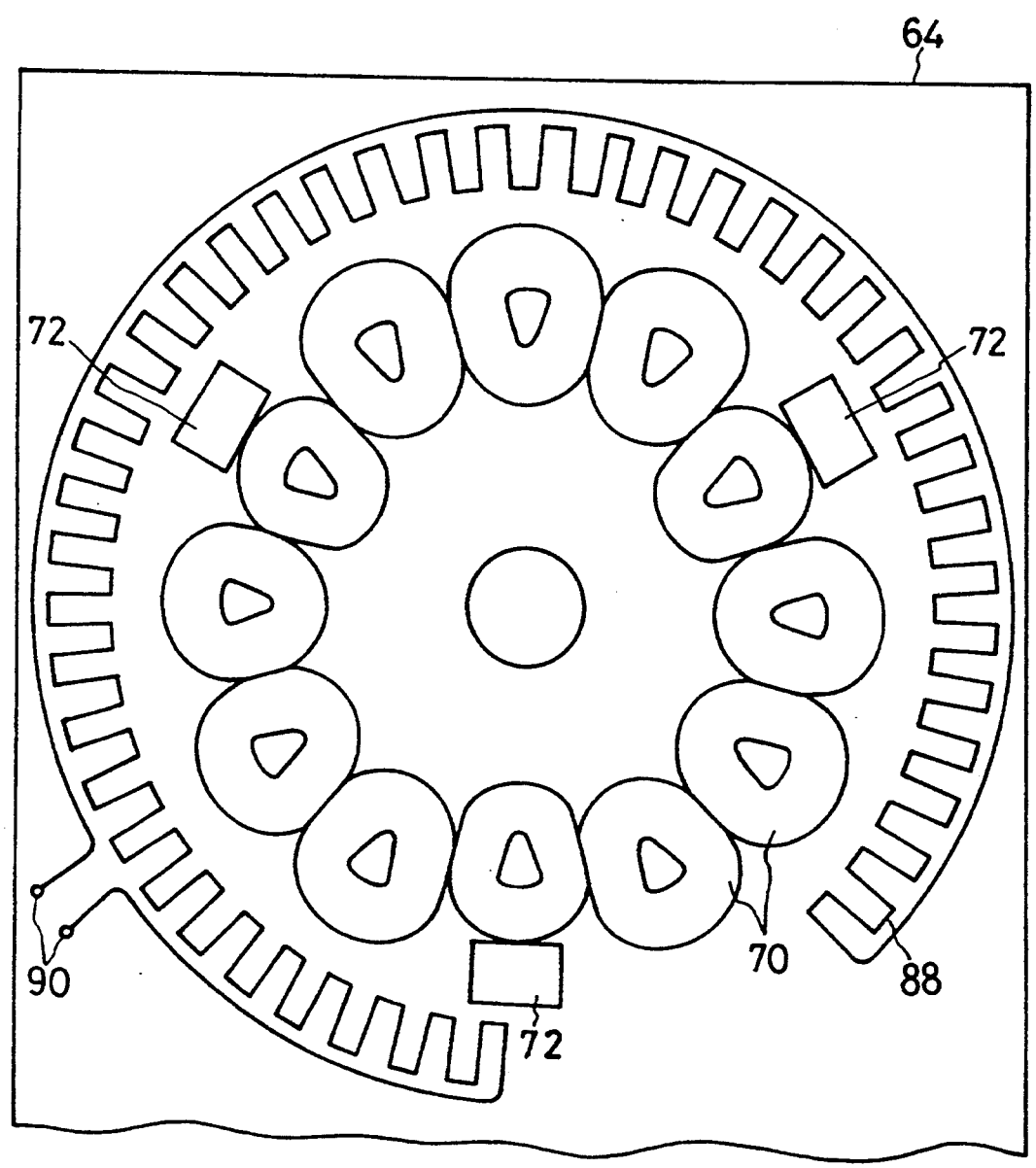
FIG. 7 is a plan view of the baseplate or printed circuit board seen in FIGS. 3 and 5, showing in particular the fixed windings of the disk drive motor, the magnetoelectric converters, and the coil of the speed sensor.

As depicted also in FIGS. 3-5 and in more detail in FIGS. 6 and 7, a disk drive motor 66 is shown as being of the known rotor outside stator configuration comprising a permanent magnet rotor 68 and fixed windings 70. The rotor 68 is of annular shape, having eight north seeking poles S and eight south seeking poles S arranged alternately as in FIG. 6. This annular rotor 68 is affixed to the underside of the turntable 40 in coaxial relationship thereto. Itself made of magnetic material, the turntable 40 serves as a yoke carrying the rotor 68 for joint rotation therewith.

The motor windings 70 are immovably mounted on the printed circuit board 64 in annular arrangement and opposed to the rotor 68. Although twelve motor windings 70 are shown in FIG. 7, it is understood that the disk drive motor 66 is a three phase motor, having a first, a second and a third phase group of windings. Further, as indicated also in FIG. 7, the disk drive motor 66 is conventionally provided with three magnetoelectric converters 72 such as Hall effect elements for its speed control. The magnetoelectric converters 72 are arranged at angular spacings of 120 degrees on the printed circuit board 64 in concentric relationship with the motor windings 70 so as to be acted upon by the rotor 68.

Actually, the printed circuit board 64 has formed thereon a conductive pattern necessary for the electrical connection of the motor windings 70 and the magnetoelectric converters 72. Such conductive pattern is not shown in FIG. 7 for its conventional and well known nature.

At 74 in FIGS. 4-7 is seen a drive pin disposed eccentrically on the turntable 40 for driving engagement in the eccentric opening 36, FIG. 2, in the disk hub 32. Despite its name, however, the drive pin 74 takes the form of a roll 76 rotatably mounted on an upstanding shaft 78 for rolling contact with the disk hub edges bounding the eccentric opening or slot 36. Erected on a distal end of a support spring 80 under the turntable 40, the drive pin 74 extends upwardly therefrom through a clearance hole 82 in the turntable 40. The support spring 80 has its proximal end pivoted at 84 to the underside of the turntable 40 for angular displacement in a plane parallel to that of the turntable. Thus the drive pin 74 on the free end of the support spring 80 is movable substantially radially of the turntable 40, within the limits set by the clearance hole 82, besides being resiliently displaceable in a direction parallel to the axis of the spindle 50.

When the disk cassette 10 is placed on the turntable 40 as shown in FIGS. 3, the spindle 60 will immediately enter the central opening 34 in the disk hub 32. In all likelihood, however, the drive pin 74 will initially be out of register with the eccentric slot 36 in the disk hub 32 and so will be thereby depressed into the turntable 40 against the force of the support spring 62. The drive pin 56 will come into register with the eccentric slot 36 as the turntable 40 is subsequently set into rotation. Thereupon the drive pin 74 will enter the eccentric slot 36 under the force of the support spring 80 and then, displaced radially inwardly of the turntable by the disk hub 32 against the force of the support spring 62, make driving engagement with the disk hub, imparting the rotation of the turntable 40 to the magnetic disk 12 within the cassette envelope 14.

The construction of the disk drive 38 as so far described is largely conventional, and therein lies no feature of the present invention. The novel features of the invention will appear in the course of the following description.

With reference to FIG. 5 an electromagnetic speed sensor 85 is provided for detecting the speed of rotation of the turntable 40 and hence of the disk drive motor 66. The speed sensor 85 comprises a permanent magnet 86 on the turntable 40 and a coil 88 on the printed circuit board 64.

As illustrated in more detail in FIG. 6, the permanent magnet 86 of the speed sensor 85 is of annular shape, having forty nine north seeking poles and forty nine south seeking poles arranged alternately. The magnet 86 is concentrically mounted to the periphery of the turntable 40 for joint rotation therewith. The poles of the speed sensor magnet 86, as well as the poles of the disk drive motor magnet 68, have predetermined positional relationship to the eccentric drive pin 74 on the turntable 40.

FIG. 7 shows the coil 88 of the speed sensor 85 in detail. The speed sensor coil 88 is an annular combed conductive pattern on the printed circuit board 64, having teeth arranged with the same pitch as the north and south pole pairs of the speed sensor magnet 86. Voltages are periodically induced in the speed sensor coil 88 as the speed sensor magnet poles traverse them. The periodic voltage output thus obtained at the pair of terminals 90 of the speed sensor coil 88 is herein referred to as the first motor speed signal.

Figure 8:
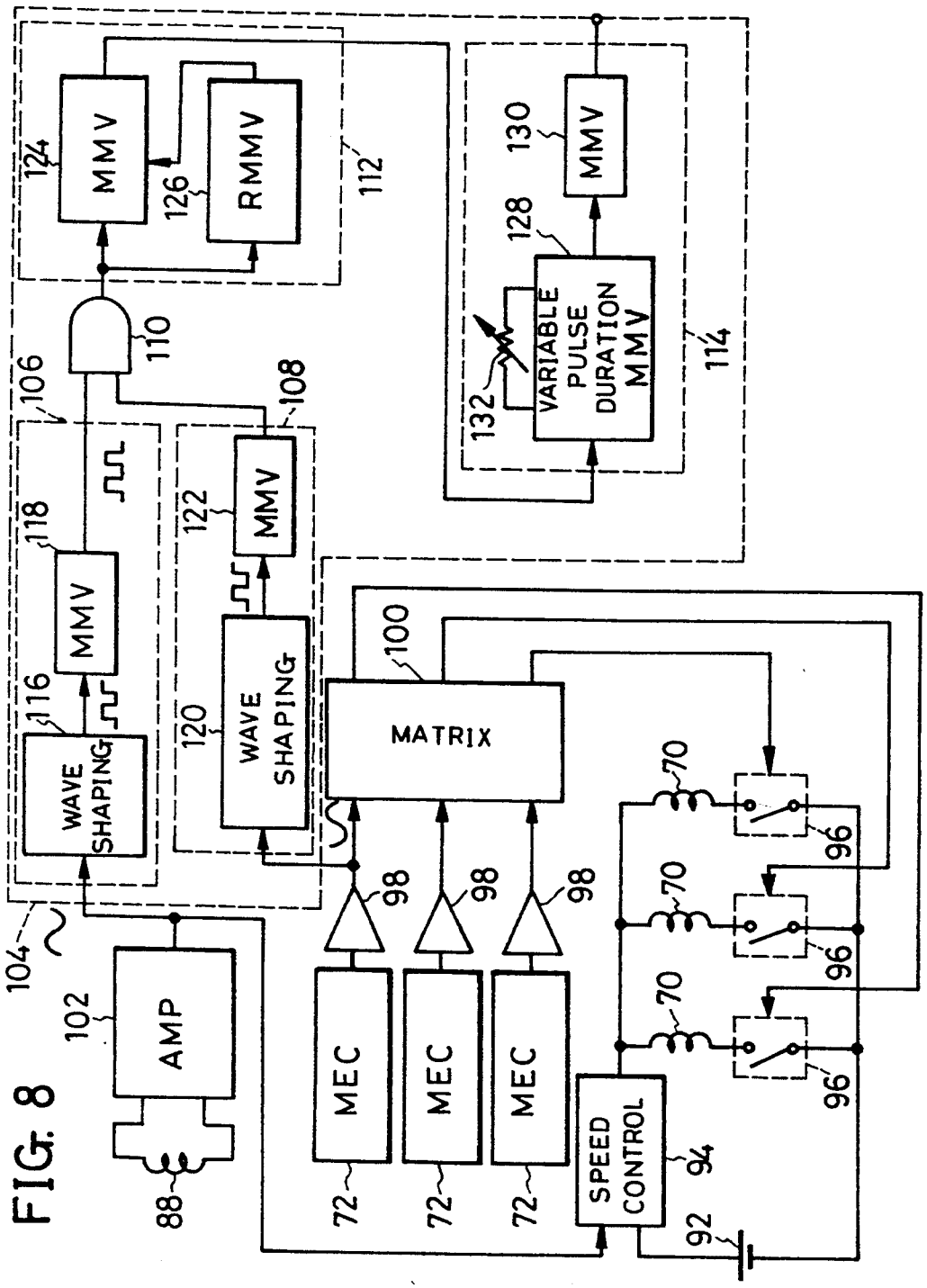
FIG. 8 is a block diagram of the index pulse generating circuit incorporated in the FIG. 3 apparatus in accordance with the present invention, the index pulse generating circuit being shown together with a drive and control system for the disk drive motor.

FIG. 8 is a block diagrammatic illustration of a circuit for controlling the speed of rotation of the disk drive motor 66, and for generating index pulses, in response to the outputs from the speed sensor coil 88 and the magnetoelectric converters 72. This figure shows only three fixed windings 70 of the disk drive motor 66 since the motor is of three phase construction as aforesaid. The three illustrated motor windings 70 should therefore be understood to represent the first, second and third phase groups of motor windings.

Each of the three phase windings 70 of the disk drive motor 66 has one extremity connected to the positive side of a power supply 92 via a speed control circuit 94. The other extremities of the motor windings 70 are connected to the negative side of the power supply 92 via respective switches 96. For the on off control of these motor winding switches the three magnetoelectric converters 72 are connected via respective amplifiers 98 to a matrix circuit 100 and thence to the switches 96. The matrix circuit 100, itself well known in the art, determines the angular positions of the poles of the permanent magnet rotor 68 on the turntable 40 on the basis of the outputs from the magnetoelectric converters 72 and puts out signals for the on off control of the motor winding switches 96.

The voltage output (first motor speed signal) from the speed sensor coil 88 is amplified by an amplifier 102 and then fed into the speed control circuit 94. This speed control circuit functions in the known manner to control the magnitude of the current flowing through the three phase windings 70 of the disk drive motor 66 so as to make constant its speed of rotation.

Also connected to the output of the amplifier 102, as well as to the output of one of the three amplifiers 98, is an index pulse generating circuit constituting the gist of the present invention. Shown enclosed in the dashed outline and generally designated 104 in FIG. 8, the index pulse generating circuit comprises: (a) a first pulse forming circuit 106 for translating the amplified first motor speed signal from the speed sensor coil 88 into a first train of motor speed pulses; (b) a second pulse forming circuit 108 for translating the amplified output, herein referred to as the second motor speed signal, from one of the magnetoelectric converters 72 into a second train of motor speed pulses; (c) and AND gate 110 for producing pulses upon simultaneous reception of the first and the second motor speed pulses from the first 16 and the second 108 pulse forming circuits; (d) a pulse select circuit 112 for choosing only one of the output pulses from the AND gate 110 supplied during each complete revolution of the turntable 40, for use as an index pulse; and (e) an index pulse timing circuit 114 for timing the output pulses from the pulse select circuit 112 in relation to the angular position of the disk 12 on the turntable 40.

The first pulse forming circuit 106 is shown as a serial connection of a wave shaping circuit 116 and a monostable multivibrator (MMV) 118. The wave shaping circuit 116 takes the form of a zero cross comparator. Inputting the amplified sinusoidal first motor speed signal from the amplifier 102, which signal is shown at (A) in FIG. 9, the wave shaping circuit 116 translates it into a series of rectangular pulses, (B) in FIG. 9, with a duty ratio of approximately 50 percent. The number of these pulses produced by the wave shaping circuit 116 during the period $T_1$ of each complete revolution of the disk drive motor 66, and hence of the magnetic disk 12 on the turntable 40, is equal to the number, forty nine in the illustrated embodiment, of the N and S pole pairs of the speed sensor magnet 86 shown in FIG. 6.

Triggered by the leading edges of the output pulses from the wave shaping circuit 116, the MMV 118 puts out the first series of motor speed pulses seen at (C) in FIG. 9. The duration of the first series of motor speed pulses from the MMV 118 is approximately a quarter of that of the output pulses from the wave shaping circuit 116.

The second pulse forming circuit 108 is also shown as a serial connection of a wave shaping circuit 120 and an MMV 122. The wave shaping circuit 120, which can also be a zero cross comparator, has its input connected to any selected one of the three amplifiers 98. Inputting the amplified second motor speed signal from one of the magnetoelectric converters 72, which signal is shown at (D) in FIG. 9, the wave shaping circuit 120 puts out a series of rectangular pulses, not shown in FIG. 9, with a duty ratio of approximately 50 percent. The number of such pulses during the period $T_1$ of each complete revolution of the disk drive motor 66, and hence of the magnetic disk 12 on the turntable 40, is equal to the number, eight in the illustrated embodiment, of the N and S pole pairs of the disk drive motor rotor 68 shown in FIG. 6.

Triggered by the leading edges of the output pulses from the wave shaping circuit 120, the MMV 122 puts out the second series of motor speed pulses indicated at (E) in FIG. 9. The duration of the second series of motor speed pulses is less than one eighth of that of the output pulses, (B) in FIG. 9, from the wave shaping circuit 116 of the first pulse forming circuit 106.

The AND gate 110 has an input connected to the MMV 118 of the first pulse forming circuit 106, and another input connected to the MMV 122 of the second pulse forming circuit 108. Thus the AND gate 110 puts out pulses, shown at (F) in FIG. 9, when the first and the second series of motor speed pulses are input simultaneously. Three such pulses $A_1$, $A_2$ and $A_3$ are produced during the period $T_1$ of one complete revolution of the turntable 40. Being produced in the same angular positions of the turntable 40 during its successive revolutions, these pulses serve as information representative of specific angular positions of the turntable. Disk drives of the type under consideration require one index pulse for each complete revolution of the turntable, so that only one of the three pulses $A_1$, $A_2$ and $A_3$ must be chosen for use as an index pulse through the procedure set forth subsequently.

Despite the showing of FIG. 8 the AND gate 110 could be replaced by a resettable MMV. An example is MC 54/74 HC 4538 manufactured in chip form by Motorola.

The pulse select circuit 112 comprises a resettable MMV 124 and a retriggerable MMV (RMMV) 126. The resettable MMV 124 can take the form of the noted MC 54/74 HC 4538. This MMV 124 has a trigger input connected to the AND gate 110, and a reset input connected to the RMMV 126. Thus the MMV 124 is triggered by the leading edge of each output pulse from the AND gate 110 only when the signal input to its reset input is high.

At (G) in FIG. 9 is shown a "negative" pulse produced by the RMMV 126 of the pulse select circuit 112 in response to the FIG. 9(F) output pulses $A_1$, $A_2$ and $A_3$ from the AND gate 110. The duration Tm of each output pulse of the RMMV 126 is shorter than the time spacing Tx from the last pulse $A_3$ of one cycle to the first pulse $T_1$ of the next cycle, but is longer than the time spacing Ty between the pulses $A_1$ and $T_2$ and between the pulses $A_2$ and $A_3$. Consequently, triggered by the first pulse $A_1$ of each cycle, the RMMV 126 remains low for the subsequent period of Ty+Ty+Tm and goes high before the first pulse $A_1$ of the next cycle is input.

Thus the signal input to the reset input of the MMV 124 is high only when the pulse $A_1$ of each cycle is input to its trigger input, resulting in the masking of the other pulses $A_2$ and $A_3$. The resulting output from the MMV 124 is therefore as shown at (H) in FIG. 9. The "negative" pulses thus produced by the pulse select circuit 112 are substantially equivalent to the pulses $A_1$.

The index pulse timing circuit 114 comprises two MMVs 128 and 130 connected in series. Triggered by the leading edge of each "negative" output pulse from the MMV 124, which pulse is shown at (D) in FIG. 10, the MMV 128 puts out a pulse indicated at (E) in the same figure. The duration of this FIG. 10(E) pulse is variable by a variable resistor 132 constituting a time constant circuit; in other words, the trailing edge of each output pulse from the MMV 128 is adjustably variable in time. The duration of this pulse may therefore be varied so that its trailing edge may have a predetermined relationship to the eccentric drive pin 74 on the turntable 40.

Triggered by the trailing edge of each output pulse from the MMV 128, the other MMV 130 of the index pulse timing circuit 114 puts out a "negative" pulse of constant duration as at (F) in FIG. 10. This pulse, being produced at a rate of one for each complete turntable revolution, lends itself to use as index pulse.

The index pulses thus produced in accordance with the invention need confirmation as to whether they are in proper relationship to the angular position of the magnetic disk 12 on the turntable 40. To this end a formatted standard disk may be loaded in the disk drive 38, and the synchronization data written on the formatted disk may be read out for comparison with the index pulses. Then, as required, the duration of each output pulse from the MMV 128 of the index pulse timing circuit 114 may be readjusted so that the index pulses may be produced in proper relationship to the angular position of the disk on the turntable 40.

The index pulses according to the invention would be produced in proper relationship to the angular position of the magnetic disk 12 on the turntable 40 through correct positioning of the disk drive motor magnet 68, speed sensor magnet 86 and magnetoelectric converters 72 relative to the eccentric drive pin 74 on the turntable. The provision of the index pulse timing circuit 114 is nevertheless preferred because the exact positioning of the listed pertinent parts would be difficult in practice.

All the MMVs 118, 122, 124, 126, 128 and 130 of the index pulse generating circuit 104 can be the MC 54/74 HC 4538 chips.

The magnets 68 and 86 seen in FIG. 6 are so positioned relative to each other in this particular embodiment that the first $A_1$ of the second series of motor speed pulses, FIG. 9(E), from the MMV 122 of the second pulse forming circuit 108 is produced at the same time with the first of the first series of motor speed pulses, FIG. 9(C), from the MMV 118 of the first pulse forming circuit 106 during each turntable revolution. This time relationship between the first and the second series of motor speed pulses will be better understood from an inspection of (A) and (B) in FIG. 10.

As will be noted from (A) in FIG. 10, the duration Ta of each of the first series of motor speed pulses is a quarter of the period $T_2$ of the first series of motor speed pulses. As indicated at (B) in FIG. 10, on the other hand, the duration Tb of each of the second series of motor speed pulses is less than one eighth of the period $T_2$. The leading edge of the chosen one of the eight of the second series of motor speed pulses producing the period $T_1$, FIG. 9, of each complete turntable revolution is within the duration of one of the first series of motor speed pulses of FIG. 10(A). Output pulses from the AND gate 110 can be obtained as shown at (F) in FIG. 9 by relatively positioning the magnets 68 and 86 so as to meet the conditions set forth above.

There are the following two methods of causing the AND gate 110 to produce output pulses representative of specific angular positions of the turntable 40. FIG. 10 illustrates the first method. The duration Ta of each of the first series of motor speed pulses may be made not more than one half of the period $T_2$ of the first series of motor speed pulses, as at (A) in FIG. 10. Further the duration Tb of each of the second series of motor speed pulses may be made less than one eighth of the period $T_2$, as at (B) in FIG. 10. Still further the time relationship between the first and the second series of motor speed pulses may be so determined that the leading edge of at least one of the second series of motor speed pulses may be contained in one of the first series of motor speed pulses during each turntable revolution.

The second method is illustrated in FIG. 11. The duration Ta of each of the first series of motor speed pulses may be made less than one eighth of the period $T_2$ of the first series of motor speed pulses, as at (A) in FIG. 11. Further the duration Tb of the second series of motor speed pulses may be made less than one half of the period $T_2$, as at (B) in FIG. 11. Still further the time relationship between the first and the second series of motor speed pulses may be so determined that the leading edge of at least one of the first series of motor speed pulses may be contained in one of the second series of motor speed pulses during each turntable revolution.

Figure 12:
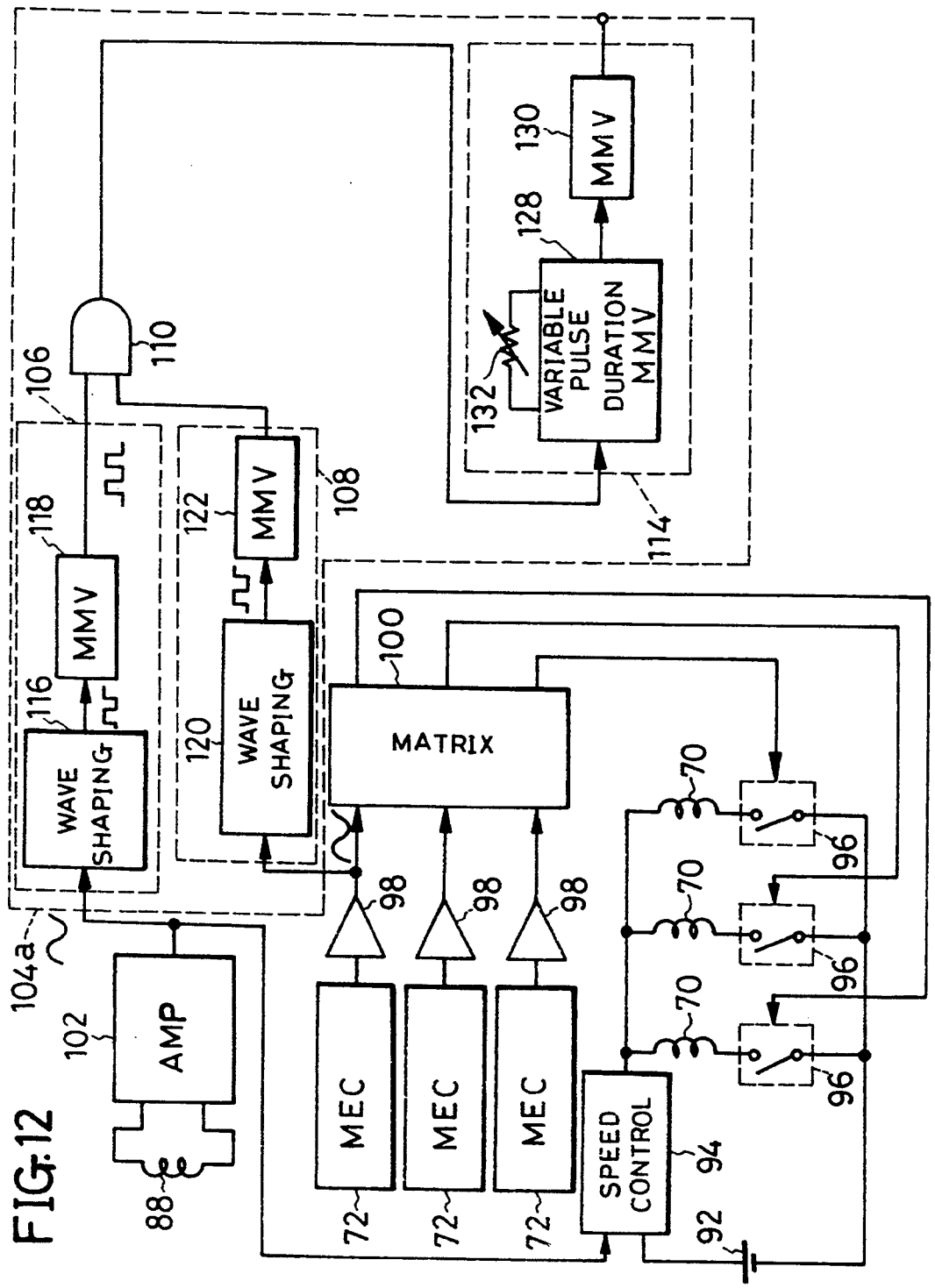
FIG. 12 is a block diagram similar to FIG. 8 but showing another preferred form of index pulse generating system in accordance with the present invention.
Figure 13A:
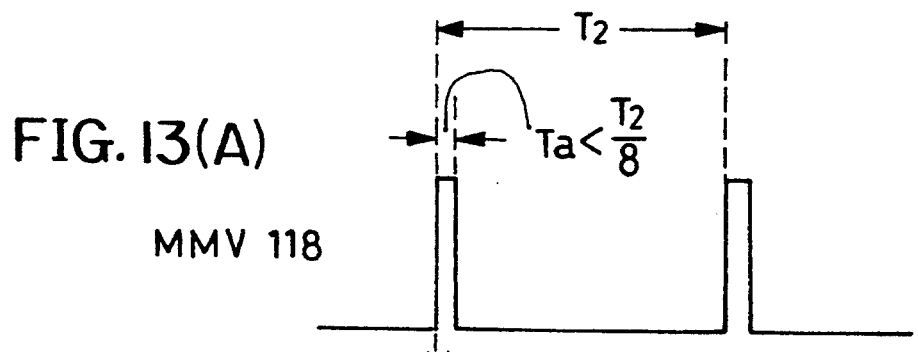
FIG. 13, consisting of (A) through (E), is a diagram of waveforms useful in explaining one mode of operation of the FIG. 12 index pulse generating system.
Figure 13B:
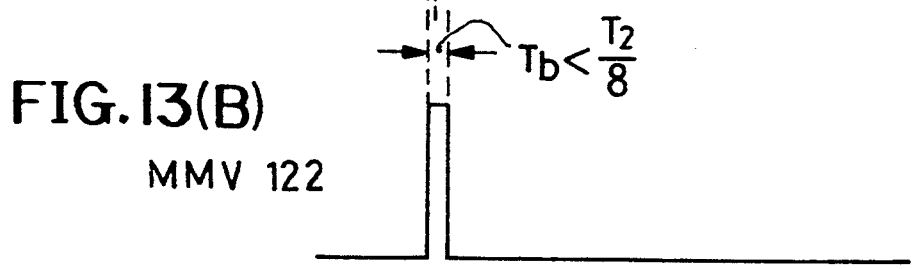
Figure 13C:
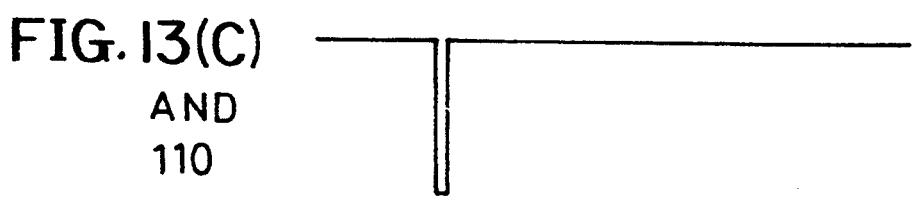
Figure 13D:
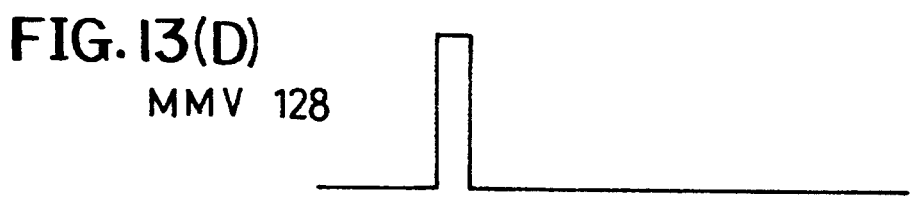
Figure 13E:
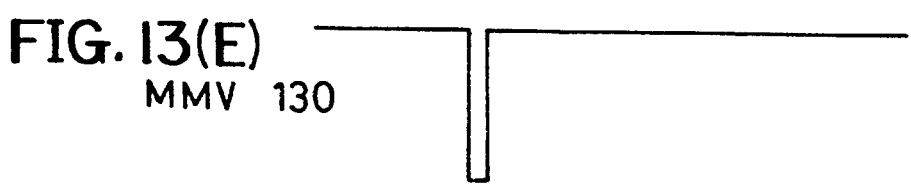
Figure 14A:
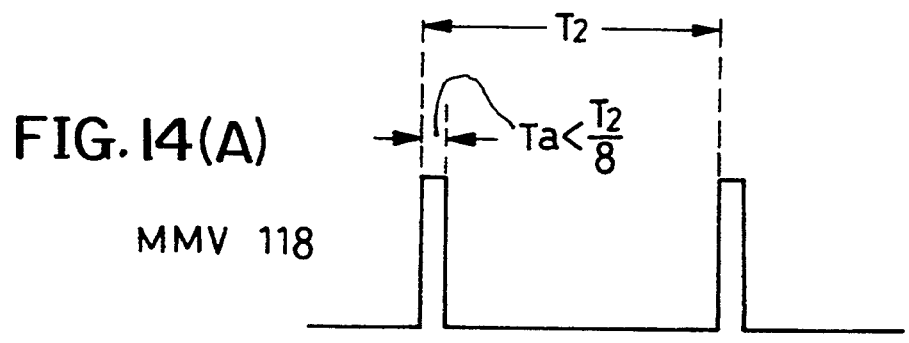
FIG. 14, consisting of (A) through (E), is a diagram of waveforms useful in explaining another mode of operation of the FIG. 12 index pulse generating system.
Figure 14B:
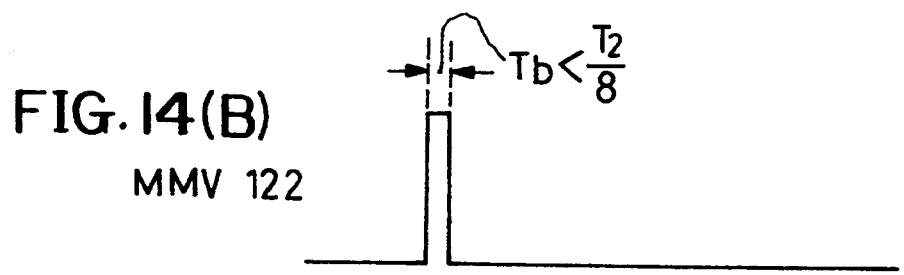
Figure 14C:
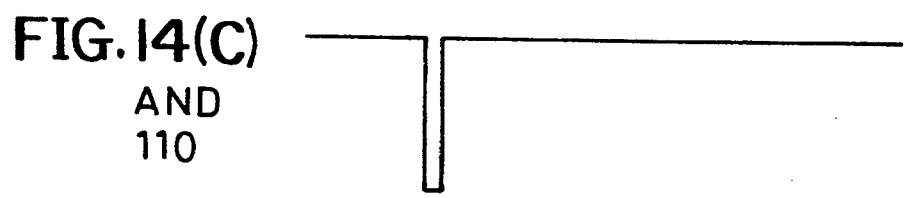
Figure 14D:
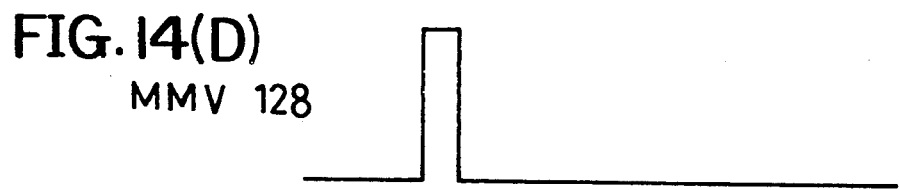
Figure 14E:
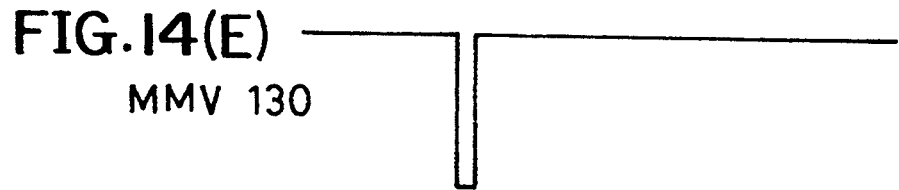

Embodiment of FIG. 12

Only one pulse can be obtained from the AND gate 110 of FIG. 8 during each turntable revolution if the two series of motor speed pulses produced by the pulse forming circuits 106 and 108 are specifically determined in terms of their relative durations and time positions. FIG. 12 shows an alternate embodiment based upon this scheme.

Generally designated 104a, the alternate index pulse generating circuit is similar to the FIG. 8 circuit 104 except that the former has no pulse select circuit 112 of the latter. The AND gate 110 is therefore connected directly to the index pulse timing circuit 114.

FIGS. 13 and 14 are explanatory of two different sets of features which the two series of motor speed pulses produced by the pulse forming circuits 106 and 108 of the alternate index pulse generating circuit 104a are required to have in order to make possible the omission of the pulse select circuit. These required features can be imparted to the motor speed pulses through appropriate positioning of the magnets 68 and 86 of FIG. 6, or of the magnetoelectric converters 72 of FIG. 7, or through adjustment of the wave shaping circuits 116 and 120, or of the MMVs 118 and 122.

In FIG. 13 the durations Ta and Tb of the two series of motor speed pulses from the MMVs 118 and 122 are both made less than one eighth of the period $T_2$ of the first series of motor speed pulses, as indicated at (A) and (B) in this figure. Further the time positions of the two series of motor speed pulses are so determined in relation to each other that the leading edge of only one of the first series of motor speed pulses, FIG. 13(A), is contained in one of the second series of motor speed pulses, FIG. 13(B), during each turntable revolution. Thus, as indicated at (C) in FIG. 13, the AND gate 110 will produce only one pulse during each turntable revolution. This output pulse from the AND gate 110 can be subsequently processed into the desired index pulse through the procedure of (D) and (E) in FIG. 13, as has already been explained with reference to FIG. 8.

The alternate set of features given in FIG. 14 is similar to that of FIG. 13 in that the durations Ta and Tb of the two series of motor speed pulses from the MMVs 118 and 122 are both made less than one eighth of the period $T_2$ of the first series of motor speed pulses, as indicated at (A) and (B) in this figure. However, the time positions of the two series of motor speed pulses are so determined in relation to each other that the leading edge of only one of the second series of motor speed pulses, FIG. 14(B), is contained in one of the first series of motor speed pulses, FIG. 14(A), during each turntable revolution. In this manner, too, the AND gate 110 will produce only one pulse during each turntable revolution, as at (C) in FIG. 14. This pulse can be subsequently processed into the desired index pulse through the procedure of (D) and (E) in FIG. 14.

Figure 15:
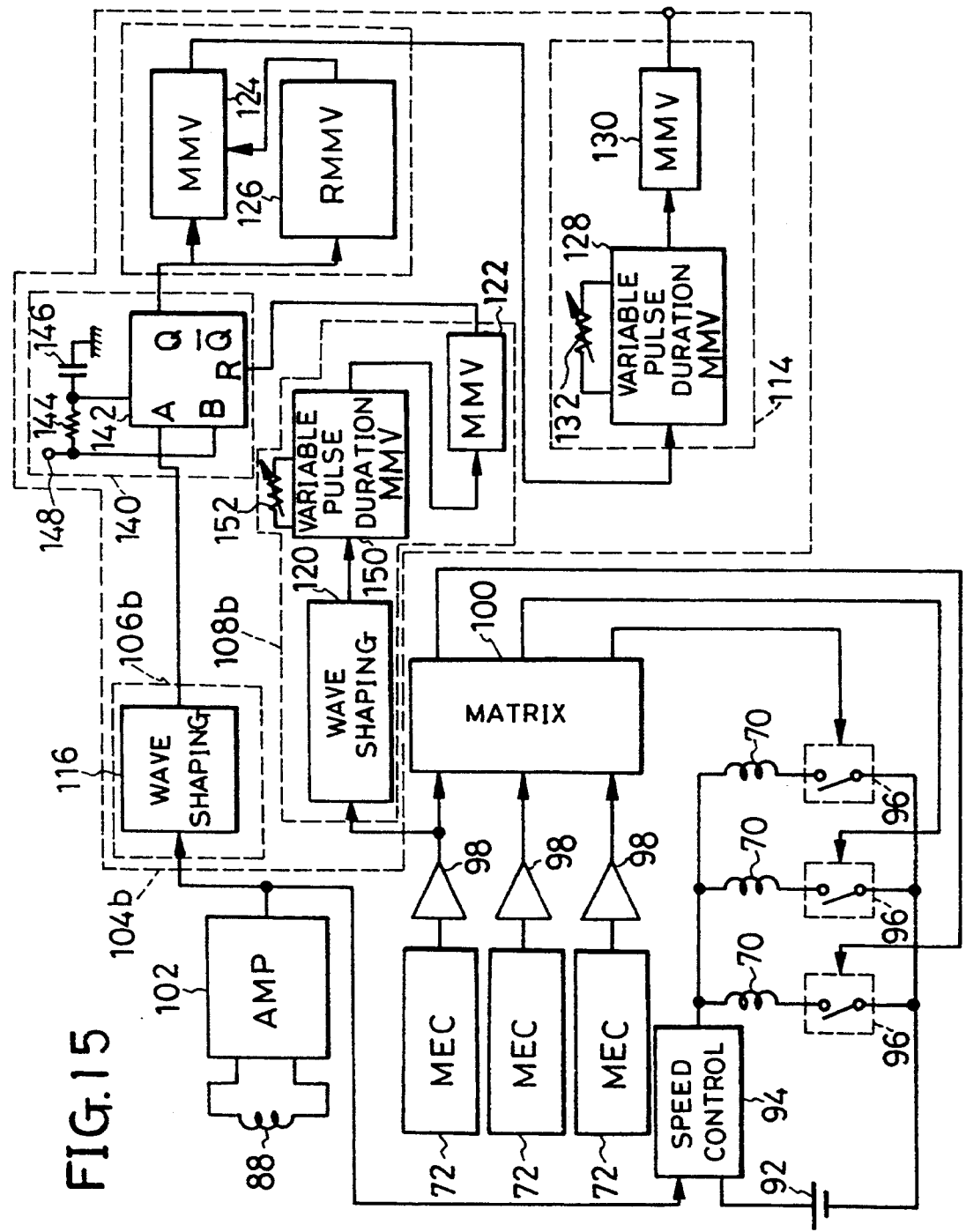
FIG. 15 is a block diagram similar to FIG. 8 but showing still another preferred form of index pulse generating system in accordance with the present invention.

Embodiment of FIG. 15

Another alternate index pulse generating cenerating circuit 104b of FIG. 15 employs an MMV 140, complete with a reset input R, in place of the AND gate 110 of the two preceding index pulse generating circuits 104 and 104a. The MMV 140, which is similar to the MMV 124 of the FIG. 8 embodiment, is a combination of the Motorola MC 54/74 HC 4538 chip 142 with a resistor 144 and a capacitor 146 for the determination of the duration of the output pulses. The chip 142 has its first trigger input A connected to the wave shaping circuit 116, which alone constitutes a first pulse forming circuit 106b, and its reset input connected to the MMV 122 included in a modified second pulse forming circuit 108b. The second trigger input B of the chip 142 is connected to a positive supply terminal 148.

Thus the MMV 140 is triggered only when the first trigger input A goes high while the reset input R is high, producing a pulse of predetermined duration. This MMV 140 is therefore equivalent in function to the AND gate 110 of the foregoing embodiments.

The second pulse forming circuit 108b is also modified to include a variable pulse duration MMV 150 between the wave shaping circuit 120 and the MMV 122. Provided with a variable resistor 152, the MMV 150 permits the duration of its output pulses to be varied as desired. The index pulse generating circuit 104bis akin in the other details of construction to the FIG. 8 circuit 104.

Figure 16:
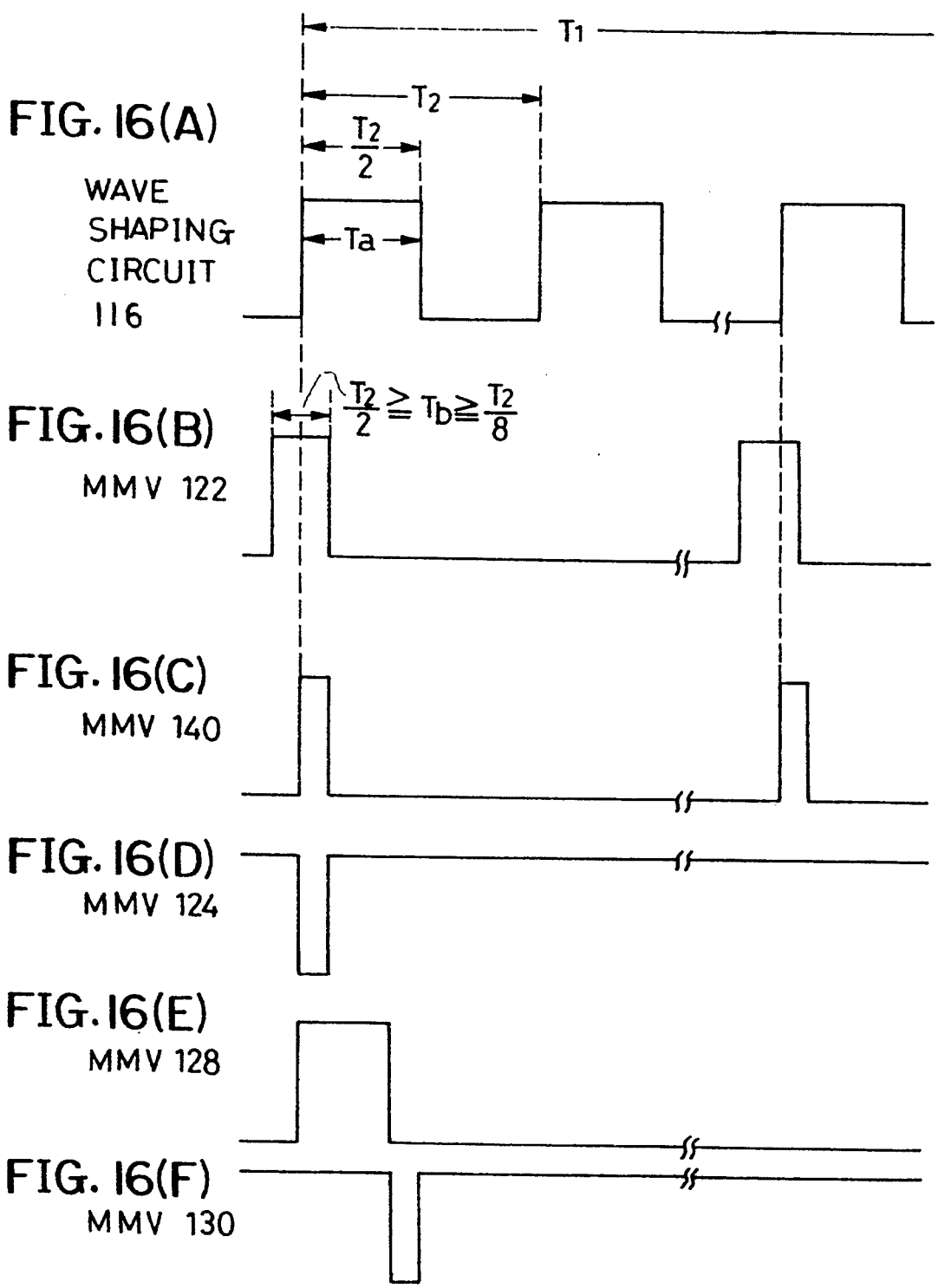
FIG. 16, consisting of (A) through (E), is a diagram of waveforms useful in explaining the operation of the FIG. 15 index pulse generating system.

FIG. 16 is explanatory of the operation of the index pulse generating circuit 104b. As indicated at (A) in this figure, the wave shaping circuit 116 forming the first pulse forming circuit 106b will put out a first series of forty nine motor speed pulses during the period $T_1$ of each turntable revolution. The duration Ta of each such pulse is one half of the period $T_2$ of the first series of motor speed pulses.

The MMV 122 of the second pulse forming circuit 108b, on the other hand, will put out a second series of eight motor speed pulses during each turntable revolution, as at (B) in FIG. 16, since the disk drive motor 66 is assumed to be of eight poles. The duration Tb of each such pulse is from one eighth to one half of the period $T_2$ of the first series of motor speed pulses. It is understood that the duration of the second series of motor speed pulses has been varied by the MMV 150 so that the leading edges of some of the first series of motor speed pulses are contained in some of the second series of motor speed pulses during each turntable revolution, as will be noted also from (A) and (B) in FIG. 16.

The MMV 140 is triggered as aforesaid by the leading edges of the first series of motor speed pulses, FIG. 16(A), only when the second series of motor speed pulses, FIG. 16(B), are being input to the reset input R. At (C) in FIG. 16 are shown the pulses of constant duration thus produced by the MMV 140. Since the MMV 140 produces two or more pulses during each turntable revolution, the pulse select circuit 112 is provided as in the FIG. 8 embodiment, for masking all but one of the input pulses as at (D) in FIG. 16. Then the output pulses from the circuit 112 are processed into the desired index pulses, as at (E) and (F) in FIG. 16, by the index pulse timing circuit 114.

Compared with the FIG. 12 embodiment, this FIG. 15 embodiment suffers the disadvantage that the pulse select circuit 112 is needed as the MMV 140 puts out a plurality of pulses during each turntable revolution. This disadvantage is amply offset, however, by the ease of fabrication of the pertinent parts since the durations Ta and Tb of the two series of motor speed pulses can be longer.

Another advantage is the reliability of the index pulses produced in this FIG. 15 embodiment. As will be understood by referring again to FIG. 16, the leading edges of the index pulses at (F) are determined by the leading edges of the first series of motor speed pulses at (A) since the leading edges of some of the first series of motor speed pulses are contained in some of the second series of motor speed pulses at (B). The first series of motor speed pulses are derived from the voltage output from the speed sensor coil seen at 88 in FIG. 7. This speed sensor coil can be formed with high accuracy by printing on the circuit board 64, with a pitch determined by the poles of the speed sensor magnet 86 on the periphery of the turntable 40. As the accuracy of the construction of the speed sensor coil 88 is reliable, so are the features of the first series of motor speed pulses derived from its voltage output. The index pulses are also reliable which are produced on the basis of the leading edges of the first series of motor speed pulses.

Figure 17:
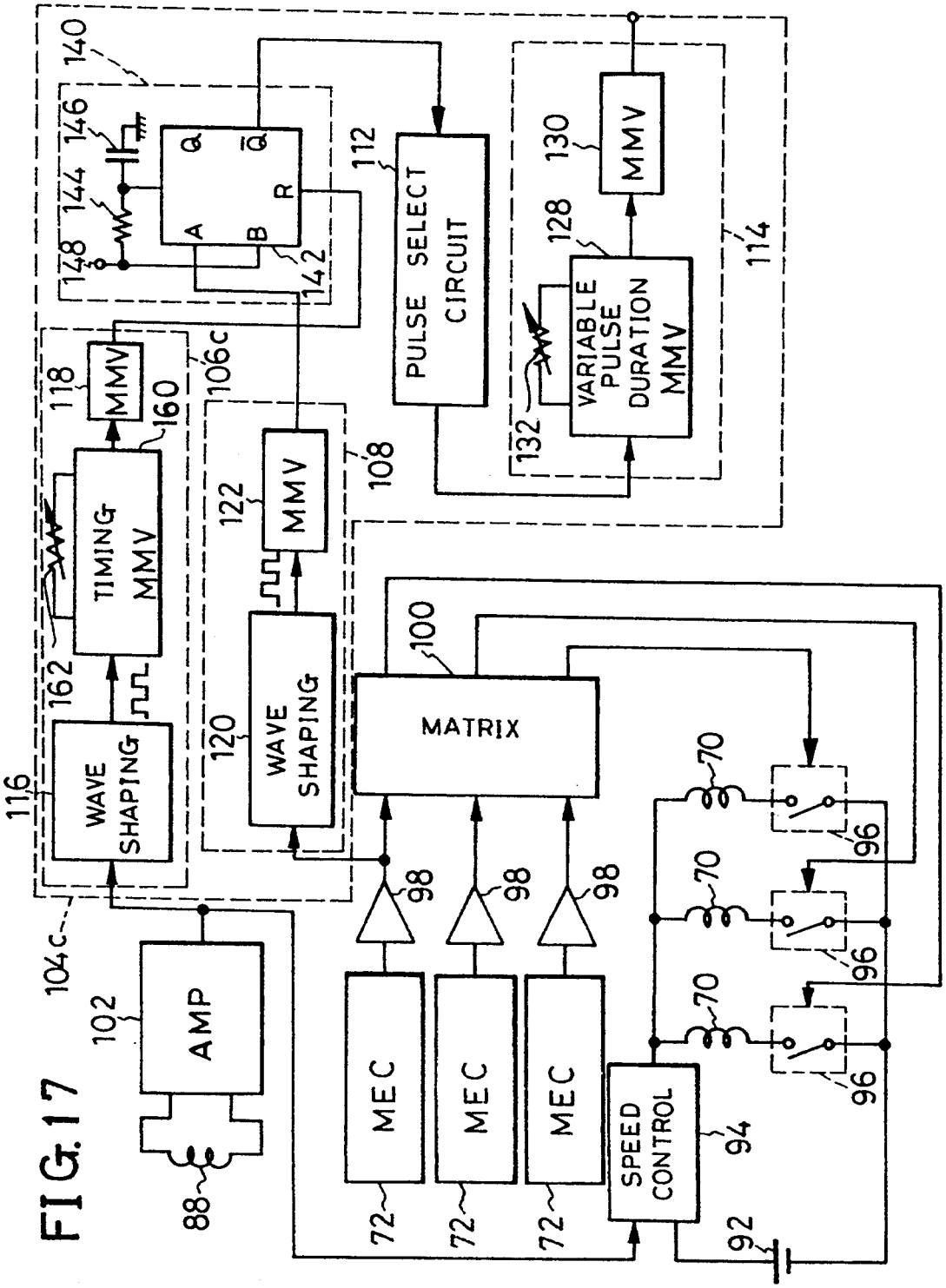
FIG. 17 is a block diagram similar to FIG. 8 but showing yet another preferred form of index pulse generating system in accordance with the present invention.

Embodiment of FIG. 17

Yet another alternate index pulse generating circuit 104c shown in FIG. 17 is skin to the FIG. 15 circuit 104b in having the MMV 140 in place of the AND gate 110 of the FIG. 8 circuit 104. However, the first pulse forming circuit 106c of the index pulse generating circuit 104c is modified to include a pulse timing MMV 160 between the wave shaping circuit 116 and the MMV 118. The MMV 160 is provided with a variable resistor 162 whereby the duration of its output pulse is variable. The second pulse forming circuit 108 is of the same construction as in the FIG. 8 circuit 104.

The index pulse generating circuit 104c also differs from the FIG. 15 circuit 104b in that the MMV 140 has its trigger input A connected to the MMV 122 of the second pulse forming circuit 108, and its reset input R to the MMV 118 of the first pulse forming circuit 106c. The pulse select circuit 112 and the index pulse timing circuit 114 are identical in construction with their counterparts in the FIG. 8 circuit 104.

Reference is directed to FIG. 18 for the operational description of the FIG. 17 index pulse generating circuit 104c. The MMV 118 of the first pulse forming circuit 106c puts out a first series of motor speed pulses at a rate of forty nine per turntable revolution. As indicated at (A) in FIG. 18, the duration Ta of each such pulse is preset at one eighth to one half of the period $T_2$ of the first series of motor speed pulses.

The MMV 122 of the second pulse forming circuit 108 puts out a second series of motor sped pulses, each with a duration Tb as at (B) in FIG. 18, at a rate of eight per turntable revolution. The leading edges of two or more of these eight motor speed pulses are contained in some of the first series of motor speed pulses. The MMV 140 is triggerable when supplied with any of the second series of motor speed pulses while being also supplied with one of the first series of motor speed pulses. Thus the MMV 140 puts out two or more pulses of predetermined duration, as at (C) in FIG. 18, during each turntable revolution. Inputting these output pulses of the MMV 140, the pulse select circuit 112 puts out only one pulse during each turntable revolution, as at (D) in FIG. 18. This pulse is subsequently processed by the index pulse timing circuit 114 into the desired index pulse through the procedure shown at (E) and (F) in FIG. 18.

Figure 19:
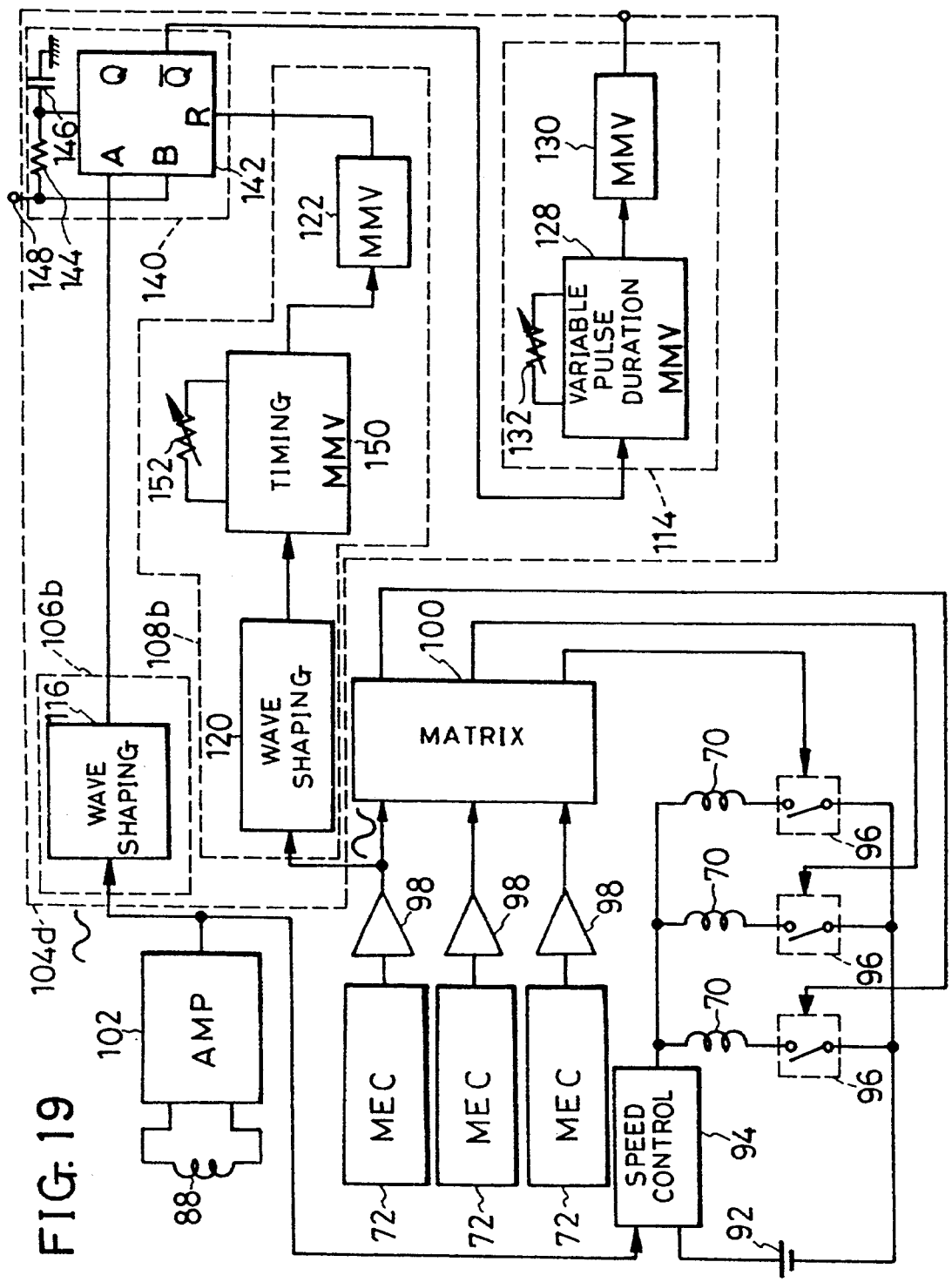
FIG. 19 is a block diagram similar to FIG. 9 but showing a further preferred form of index pulse generating system in accordance with the present invention.

Embodiment of FIG. 19

It is possible to cause the resettable MMV 140, employed in place of the AND gate 110 of FIG. 8, to produce only one pulse during each turntable revolution, through appropriate determination of the relative durations and time positions of the two series of motor speed pulses input to the MMV. FIG. 19 shows still another alternate index pulse generating circuit 104d embodying this principle. A comparison of FIG. 19 with FIG. 15 will show that this index pulse generating circuit 104d is of the same construction as the index pulse generating circuit 104b except for the absence of the pulse select circuit 112 from between MMV 140 and index pulse timing circuit 114 in the circuit 104d. The first and the second pulse forming circuits of this index pulse generating circuit 104d are therefore designated 106b and 108b, respectively.

Figure 20:
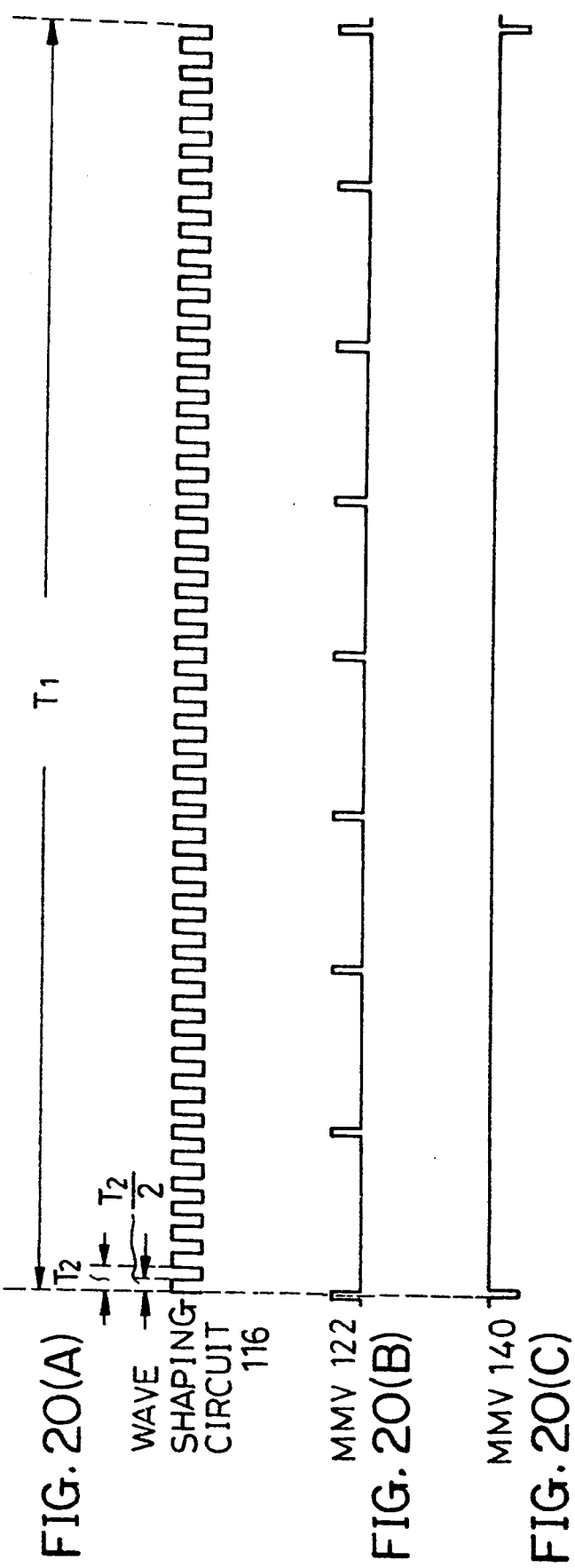
FIG. 20, consisting of (A) through (C), is a diagram of waveforms appearing in various parts of the FIG. 19 index pulse generating system.

The wave shaping circuit 116 constituting the first pulse forming circuit 106b and the MMV 122 of the second pulse forming circuit 108b put out first and second series of motor speed pulses shown at (A) and (B), respectively, in FIG. 20. The two series of motor speed pulses are so interrelated that the MMV 140 puts out only one pulse during each turntable revolution, as at (C) in FIG. 20.

Figure 21:
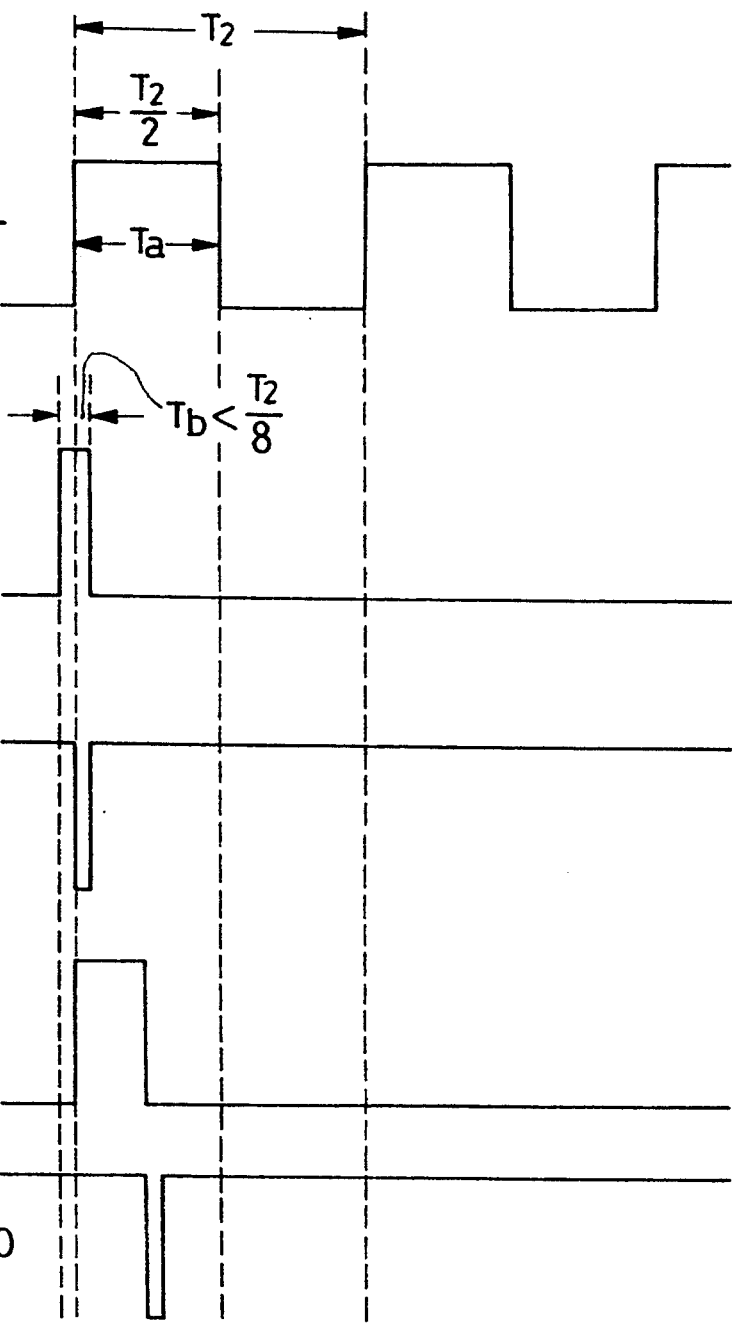
FIG. 21, consisting of (A) through (E), is a diagram of waveforms useful in explaining the operation of the FIG. 19 index pulse generating system.

As more clearly indicated at (A) and (B) in FIG. 21, the duration of each of the first series of motor speed pulses is one half of its period $T_2$ whereas the duration of each of the second series of motor speed pulses is less than one eighth of the period $T_2$. Further the relative time positions of the two series of motor speed pulses are so determined that the leading edge of only one of the first series of motor speed pulses is contained in one of the second series of motor speed pulses during each turntable revolution. Despite the showing of FIG. 21(A), the duration of the first series of motor speed pulses is of no significance because it is only their leading edges that count.

Figure 22:
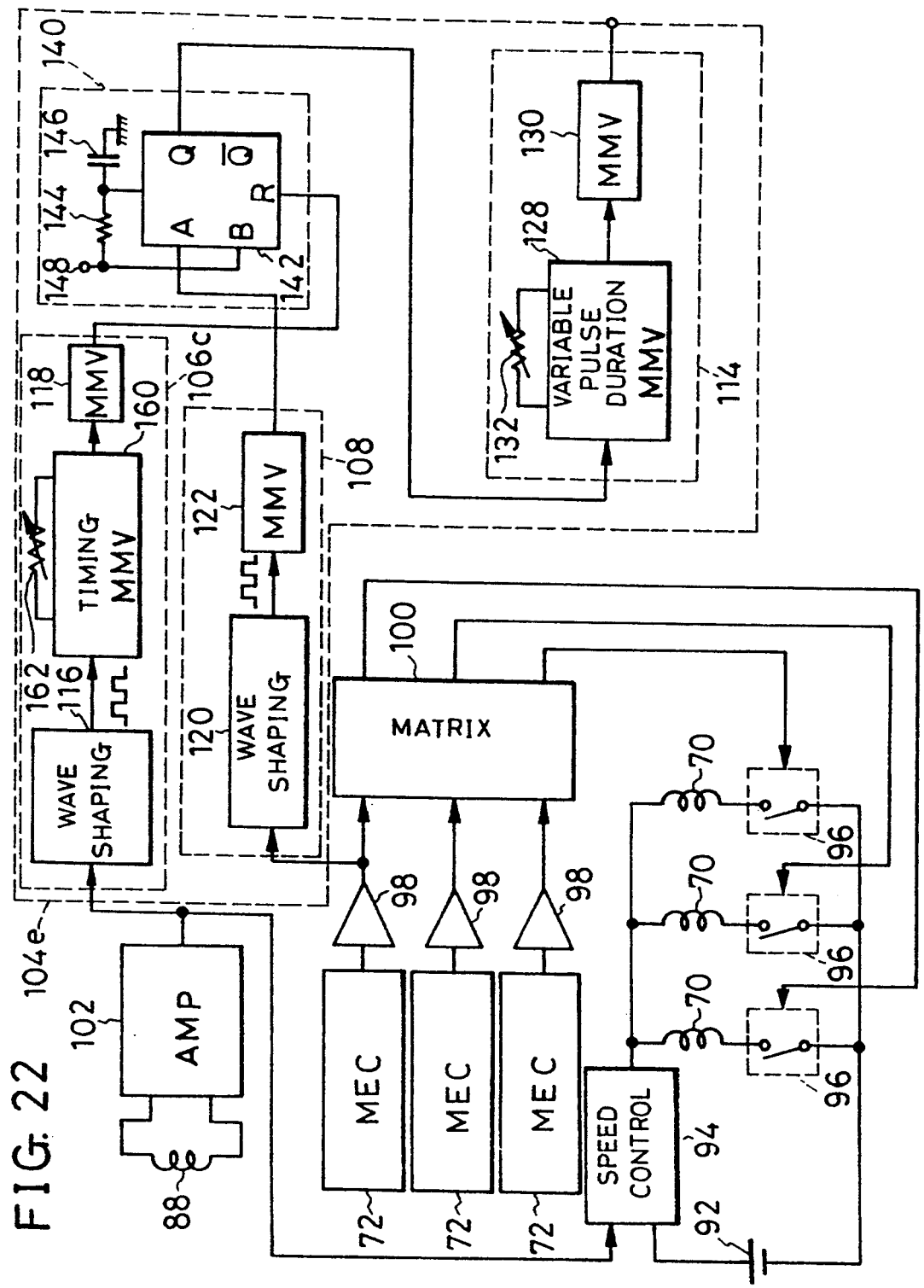
FIG. 22 is a block diagram similar to FIG. 8 but showing a still further preferred form of index pulse generating system in accordance with the present invention.

Embodiment of FIG. 22

In FIG. 22 is shown yet another alternate index pulse generating circuit 104e which differs from the FIG. 17 circuit 104c only in that the pulse select circuit 112 is absent from between resettable MMV 140 and index pulse timing circuit 114.

In this embodiment, too, as the pulse forming circuits 106c and 108 put out the two series of motor speed pulses shown at (A) and (B) in FIG. 23, the MMV 140 produces only one pulse during each turntable revolution. As indicated more clearly at (A) in FIG. 24, the duration Ta of the first series of motor speed pulses is one eighth of its period $T_2$, and the leading edge of only one of the second series of motor speed pulses is contained in one of the first series of motor speed pulses during each turntable revolution. Consequently, the MMV 140 produces only one pulse during each turntable revolution, as at (C) in FIGS. 23 and 24. It is only the leading edges of the second series of motor speed pulses that count in this embodiment, so that their duration is of no significance.

Possible Modifications

Although the index pulse generating system according to the present invention has been shown and described hereinbefore in terms of its several currently preferred forms, it is not desired that the invention be limited by the exact details of such disclosure. The following, then, is a brief list of possible modifications or alterations of the illustrated embodiments which are all believed to fall within the scope of this invention:

1. Although the first and the second pulse forming circuits put out the first and the second series of motor speed pulses at rates of forty nine and eight, respectively, per turntable revolution, combinations of other numbers are of course possible provided that they have no common measure. Examples are sixty and seven, and sixty three and eight.

2. The motor speed pulses could be formed not by the MMVs 118, 122, 150 and 160 but by deriving triangular voltage waves from the outputs from the wave shaping circuits 116 and 120 and by comparing the triangular waves with a reference voltage.

3. In cases where the speed control circuit 94 and matrix circuit 100 demand rectangular pulse inputs, the outputs from the wave shaping circuits 116 and 120 could be directed into them.

4. The disk drive motor 66 could be of various constructions other than the illustrated one.

What is claimed is:

1. In a rotating disk data storage apparatus of the type including a disk drive motor having a first permanent magnet rotor mounted to a turntable for joint rotation therewith and a plurality of phases of fixed windings to be selectively energized to cause the first permanent magnet rotor to rotate with the turntable, a speed sensor having a second permanent magnet rotor mounted to the turntable for joint rotation therewith and a fixed speed sensor coil acted upon by the second permanent magnet rotor for generating a first periodic motor speed signal, and a magnetoelectric converter acted upon by the first permanent rotor for generating a second periodic motor speed signal, an index pulse generating system comprising:

(a) a first pulse forming circuit to be connected to the speed sensor coil for translating the first periodic motor speed signal into a first series of motor speed pulses, the first motor speed signal having a first predetermined number of cycles per complete revolution of the turntable so that the first series of motor speed pulses are produced at a rate of the first predetermined number per complete revolution of the turntable;

(b) a second pulse forming circuit to be connected to the magneto-electric converter for translating the second periodic motor speed signal into a second series of motor speed pulses, the second motor speed signal having a second predetermined number of cycles per complete revolution of the turntable so that the second series of motor speed pulses are produced at a rate of the second predetermined number per complete revolution of the turntable, the first and the second predetermined number being different;

(c) a coincidence circuit connected to the first and the second pulse forming circuits for producing a plurality of pulses during each complete revolution of the turntable when concurrently supplied with the first and the second series of motor speed pulses; and (d) a pulse select circuit connected to the coincidence circuit for suppressing all but one of the output pulses of the coincidence circuit during each complete revolution of the turntable.

2. The index pulse generating system of claim 1 further comprising a timing circuit for adjustably varying the time position of the output pulse of the coincidence circuit in relation to the rotation of the turntable.

3. The index pulse generating system of claim 1 wherein the output pulses of the coincidence circuit include two which have a time spacing ($T_x$) therebetween which is longer than half a period ($T_1$) of one complete revolution of the turntable, and wherein the pulse select circuit suppresses all the output pulses of the coincidence circuit but the one appearing at the end of the time spacing ($T_x$) longer than half the period of one complete revolution of the turntable.

4. The index pulse generating system of claim 3 wherein the pulse select circuit comprises:

(a) a retriggerable monostable multivibrator connected to the coincidence circuit and triggered by each output pulse therefrom for generating a pulse having a duration ($T_m$) which is shorter than the time spacing ($T_x$) between said two of the output pulses of the coincidence circuit and longer than a time spacing ($T_y$) between the second series of motor speed pulses; and (b) a nonretriggerable monostable multivibrator connected to both the coincidence circuit and the retriggerable monostable multivibrator and triggered by the output pulses of the coincidence circuit when not supplied with the output pulses of the retriggerable monostable multivibrator.

5. In a rotating disk data storage apparatus of the type including a disk drive motor having a first permanent magnet rotor mounted to a turntable for joint rotation therewith and a plurality of phases of fixed windings to be selectively energized to cause the first permanent magnet rotor to rotate with the turntable, a speed sensor having a second permanent magnet rotor mounted to the turntable for joint rotation therewith and a fixed speed sensor coil acted upon by the second permanent magnet rotor for generating a first periodic motor speed signal, and a magnetoelectric converter acted upon by the first permanent rotor for generating a second periodic motor speed signal, an index pulse generating system comprising:

(a) a first pulse forming circuit to be connected to the speed sensor coil for translating the first periodic motor speed signal into a first series of motor speed pulses, the first motor speed signal having a first predetermined number of cycles per complete revolution of the turntable so that the first series of motor speed pulses are produced at a rate of the first predetermined number per complete revolution of the turntable;

(b) a second pulse forming circuit to be connected to the magneto-electric converter for translating the second periodic motor speed signal into a second series of motor speed pulses, the second motor speed signal having a second predetermined number of cycles per complete revolution of the turntable so that the second series of motor speed pulses are produced at a rate of the second predetermined number per complete revolution of the turntable, the first and the second predetermined number being different; and (c) a logical sum circuit connected to the first and the second pulse forming circuits for producing at least one pulse during each complete revolution of the turntable when concurrently supplied with the first and the second series of motor speed pulses.

6. The index pulse generating system of claim 5 wherein each of the first series of motor speed pulses has a duration ($T_a$) not more than one half of a period ($T_2$) of the first series of motor speed pulses, wherein each of the second series of motor speed pulses has a duration ($T_b$) less than one eighth of the period ($T_2$) of the first series of motor speed pulses, and wherein the first and the second series of motor speed pulses have time positions so interrelated that the leading edge of at least one of the second series of motor speed pulses is contained in one of the first series of motor speed pulses during each complete revolution of the turntable.

7. The index pulse generating system of claim 5 wherein each of the first series of motor speed pulses has a duration ($T_a$) less than one eighth of a period ($T_2$) of the first series of motor speed pulses, wherein each of the second series of motor speed pulses has a duration ($T_b$) not more than one half of the period ($T_2$) of the first series of motor speed pulses, and wherein the first and the second series of motor speed pulses have time positions so interrelated that the leading edge of at least one of the first series of motor speed pulses is contained in one of the second series of motor speed pulses during each complete revolution of the turntable.

8. The index pulse generating system of claim 5 wherein each of the first and the second series of motor speed pulses has a duration ($T_a$, $T_b$) less than one eighth of a period ($T_2$) of the first series of motor speed pulses, and wherein the first and the second series of motor speed pulses have time positions so interrelated that the leading edge of only one of the first series of motor speed pulses is contained in one of the second series of motor speed pulses during each complete revolution of the turntable, whereby the logical sum circuit puts out only one pulse during each complete revolution of the turntable.

9. The index pulse generating system of claim 5 wherein each of the first and the second series of motor speed pulses has a duration ($T_a$, $T_b$) less than one eighth of a period ($T_2$) of the first series of motor speed pulses, and wherein the first and the second series of motor speed pulses have time positions so interrelated that the leading edge of only one of the second series of motor speed pulses is contained in one of the first series of motor speed pulses during each complete revolution of the turntable, whereby the logical sum circuit puts out only one pulse during each complete revolution of the turntable.

* * * * *